(12) United States Patent
Moore et al.

(10) Patent No.: US 11,435,590 B2
(45) Date of Patent: Sep. 6, 2022

(54) SYSTEMS, DEVICES, AND METHODS FOR STABILIZING DISPLAY COMPONENTS IN WEARABLE HEADS-UP DISPLAYS

(71) Applicant: GOOGLE LLC, Mountain View, CA (US)

(72) Inventors: Joshua Moore, Elora (CA); Xiaofeng Li, Kitchener (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/001,340

(22) Filed: Aug. 24, 2020

(65) Prior Publication Data

US 2021/0055565 A1 Feb. 25, 2021

Related U.S. Application Data

(60) Provisional application No. 62/890,269, filed on Aug. 22, 2019.

(51) Int. Cl.
*G06F 1/16* (2006.01)
*G02B 27/01* (2006.01)

(52) U.S. Cl.
CPC .......... *G02B 27/0176* (2013.01); *G06F 1/163* (2013.01); *G06F 1/1681* (2013.01); *G02B 2027/0178* (2013.01)

(58) Field of Classification Search
CPC ........ G02B 27/0176; G02B 2027/0178; G06F 1/163; G06F 1/1681
See application file for complete search history.

(56) References Cited

U.S. PATENT DOCUMENTS

2012/0218301 A1* 8/2012 Miller ................ G02B 27/0172
345/633
2016/0048025 A1* 2/2016 Cazalet .............. G02B 27/0176
351/116
2019/0162983 A1* 5/2019 Montalban ........... G02C 5/2281

* cited by examiner

*Primary Examiner* — Robert J Michaud

(57) ABSTRACT

Techniques are described for providing stabilized display components in a wearable heads-up display. A hinge is provided that includes at least two portions rotatable relative to each other, such that each portion may be directly coupled to an optical combiner or a light engine. A bias element may be provided to bias arms of a WHUD towards an unfolded configuration. The bias element and surrounding structure may inhibit movement of arms of the WHUD between the unfolded configuration and a folded configuration.

23 Claims, 24 Drawing Sheets

SYSTEMS, DEVICES, AND METHODS FOR STABILIZING DISPLAY COMPONENTS IN WEARABLE HEADS-UP DISPLAYS

BACKGROUND

Electronic devices are commonplace throughout most of the world today. Advancements in integrated circuit technology have enabled the development of electronic devices that are sufficiently small and lightweight to be carried by the user. Such portable electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or via a wired connection.

The convenience afforded by the portability of electronic devices has fostered a huge industry. Smartphones, audio players, laptop computers, tablet computers, and e-book readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Because they are worn on the body of the user, and typically visible to others, and generally present for long periods of time, form factor (i.e., size, geometry, and appearance) is a major design consideration in wearable electronic devices.

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display may typically be either transparent or at a periphery of the user's field of view so that it does not completely block the user from being able to see their external environment. Non-limiting examples of wearable heads-up displays include: the Google Glass®, the Optinvent Ora®, the Epson Moverio®, and the Microsoft Hololens®.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Various prior solutions typically employ large display components and, as a result, the corresponding wearable heads-up displays are typically bulkier and less stylish than conventional eyeglass frames.

Additionally, it is desirable for a wearable heads up display to fold, collapse, or otherwise shrink down in size when not being used, as this will make the wearable heads-up display take up less storage space and be more portable when not in use. Traditional eyeglasses typically fold at a pair of hinges connecting the temple arms to the front frame, such that the eyeglasses typically fit in a slim rectangular, cylindrical, or oblong case. It is desirable to achieve wearable heads-up displays which fold similarly to traditional eyeglasses, as this will achieve a very compact and portable storage configuration, and will also help achieve an appearance which more closely resembles that of traditional eyeglasses. This improves both flexibility and social acceptance of the wearable heads-up display. However, achieving traditional eyeglasses-type folding in wearable heads-up displays has proven challenging.

BRIEF SUMMARY OF EMBODIMENTS

According to a one aspect, the present disclosure describes a system comprising: a light engine assembly; an optical combiner assembly; and a hinge, the hinge comprising: a first portion coupled to the optical combiner assembly at a first interface; a second portion coupled to the light engine assembly at a second interface; and a pivot coupled to both the first portion and the second portion, the second portion to rotate relative to the first portion about the pivot.

The system may further comprise a support structure to be worn on a head of a user, the support structure comprising a first arm to be positioned on a first side of the head of the user and a front frame to be positioned on a front side of the head of the user. The front frame may be directly coupled to the optical combiner assembly, and the first arm may be directly coupled to the light engine assembly. The front frame may be directly coupled to the first portion of the hinge, and the first arm may be directly coupled to the second portion of the hinge.

The first interface may include at least one mechanical fastener, and the second interface may include at least one mechanical fastener. The at least one mechanical fastener of the first interface may include at least one of a screw, a pin, a rivet, a protrusion, or a clip; and the at least one mechanical fastener of the second interface may include at least one of a screw, a pin, a rivet, a protrusion, or a clip.

The optical combiner assembly may include at least one receptacle, and the first interface may include at least one mechanical fastener which interfaces with the at least one receptacle. The optical combiner assembly may include at least two receptacles, and the first interface may include at least two mechanical fasteners which each interface with a respective receptacle of the at least two receptacles. The first portion may include at least one receptacle, and the first interface may include at least one mechanical fastener which interfaces with the at least one receptacle.

The light engine assembly may include at least one receptacle, and the second interface may include at least one mechanical fastener which interfaces with the at least one receptacle. The second portion may include at least one receptacle, and the second interface may include at least one mechanical fastener which interfaces with the at least one receptacle.

The light engine assembly may include at least one mounting bracket, and the second interface may include at least one mechanical fastener which interfaces with the at least one mounting bracket.

The second portion may be to rotate relative to the first portion about the pivot between an unfolded configuration and a folded configuration; the first portion of the hinge may comprise a stop and a cam, the cam positioned radially further from the pivot than the stop; the second portion of the hinge may carry a bias element, the bias element to project from the second portion to contact the stop of the first portion in the unfolded configuration; and the bias element may be further to contact the cam in a partial-folded configuration between the folded configuration and the unfolded configuration.

According to a broad aspect, the present disclosure describes a method of manufacturing a wearable heads-up display ("WHUD"), the method comprising: coupling a first portion of a hinge to a second portion of the hinge by a pivot, the first portion of the hinge to rotate relative to the second portion of the hinge about the pivot; coupling the first portion of the hinge to an optical combiner assembly; and coupling the second portion of the hinge to a light engine assembly.

The method may further comprise: directly coupling the first portion of the hinge to a front frame of the WHUD to be positioned on a front of a head of a user; and directly coupling the second portion of the hinge to a first arm to be positioned on a side of the head of the user adjacent the front of the head of the user.

The method may further comprise: directly coupling the optical combiner assembly to a front frame to be positioned on a front of a head of a user; directly coupling the light engine assembly to a first arm to be positioned on a side of the head of the user adjacent the front side of the head of the user.

According to another broad aspect, the present disclosure describes a hinge comprising: a pivot; a first portion coupled to the pivot, wherein the first portion includes a first stop and a cam, and wherein the cam is positioned radially further from the pivot than the first stop; and a second portion coupled to the pivot, wherein the second portion includes a bias element that projects therefrom, and wherein the second portion rotates relative to the first portion about the pivot between a folded configuration, a partial-folded configuration in which the bias element of the second portion contacts the cam of the first portion, and an unfolded configuration in which the bias element of the second portion contacts the first stop of the first portion.

The first portion may further comprise a second stop non-parallel to the first stop, the bias element to project from the second portion towards the second stop in the folded configuration. In the folded configuration the bias element may contact the second stop. In the folded configuration the bias element may not contact the second stop.

The second portion may include a cavity, and the bias element may be positioned within the cavity and project towards an opening of the cavity. The bias element may be carried on a surface of the second portion. The bias element may include a spring. The bias element may include a piston. The cam may be a curved surface. The cam may comprise at least one sharp point.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
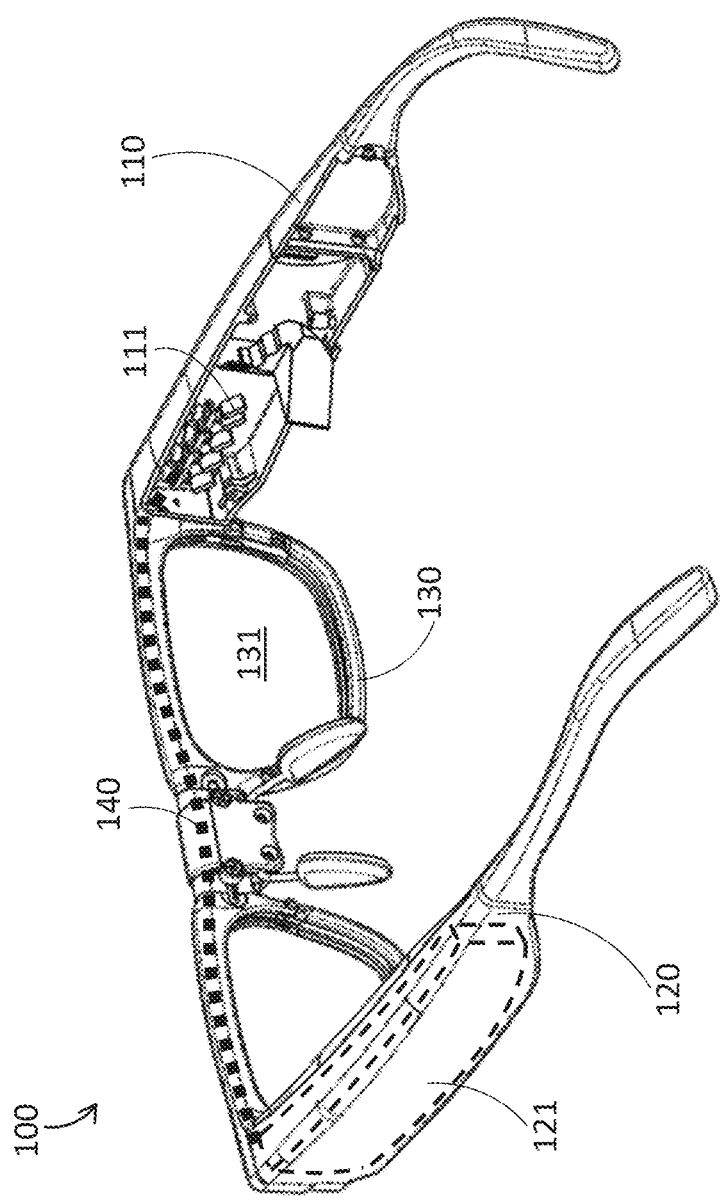
FIG. 1 is a partial-cutaway perspective diagram of an exemplary wearable heads-up display ("WHUD") in accordance with one or more embodiments described herein.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

A light engine for a display may be positioned in an arm of a wearable heads-up display; an optical combiner which redirects light from the light engine towards a user's eye may be positioned in a front frame. In order for the display to be visible and high quality, it is advantageous to precisely and consistently control the relative positioning of the light engine and the optical combiner. However, coupling the arms to the front frame with a movable part such as a hinge typically reduces stability of the arms relative to the front frame. Consequently, the relative positioning of the light engine and optical combiner becomes difficult to control. Further, introducing intermediate coupling components, such as a hinge, can increase positioning errors during manufacturing of the device, which may also reduce display quality or even render the display non-functional.

Techniques described herein enable, inter alia, arms of a wearable heads-up device to fold relative to a front frame of the wearable heads-up device, while securing the relative positioning of the light engine and the optical combiner in use. Various embodiments of such techniques include systems, devices, and methods for wearable heads-up displays in which temple arms of wearable heads-up displays may move relative to front frames of the wearable heads-up displays, while maintaining high performance and display quality of the wearable heads-up display. As used herein, the terms "directly coupled," "mechanically coupled," and "physically coupled" may be utilized with respect to two or more physical elements to indicate conjoined placement of such physical elements in a fixed position relative to one another, and shall not be construed to implicate the presence or absence of other such physical elements unless context clearly dictates otherwise.

FIG. 1 is a partial-cutaway perspective diagram of an exemplary embodiment of a wearable heads-up display ("WHUD") 100 in accordance with the present disclosure. WHUD 100 includes a first arm 110, a second arm 120, and a front frame 130 which is physically coupled to first arm 110 and second arm 120. When worn by a user, first arm 110 may be positioned on a first side of a head of the user, second arm 120 may be positioned on a second side of a head of the user opposite the first side of the head of the user, and front frame 130 may be positioned on a front side of the head of the user. First arm 110 is coupled to a light engine 111 which outputs light representative of display content to be viewed by the user. First arm 110 may also optionally be coupled to several additional components of WHUD 100, as will be discussed in more detail later. Front frame 130 is coupled to an optical combiner 131 in a field of view of the user which receives light output from the light engine 111 and redirects this light to form a display to be viewed by the user. In the case of FIG. 1, the display will be a monocular display visible to a right eye of the user. Second arm 120 as shown in FIG. 1 is coupled to a power source 121 which powers the components of WHUD 100. Front frame 130 is also coupled to at least one set of electrically conductive current paths 140 which provide electrical coupling between power source 121 and light engine 111, and any other electrical components carried by first arm 110. "Power source" as used herein can refer to a component which provides electrical power. This may include for example a source of stored power such as a battery, including a chemical battery or a mechanical battery, or may include power generation systems such as piezoelectric elements, solar cells, or similar. A "set of electrically conductive current paths" as used herein can refer to a single electrically conductive current path, such as a wire or conductive trace on a printed circuit board, as well as a plurality of electrically conductive current paths, such as a plurality of wires or a plurality of conductive traces on a printed circuit board. Further, for a set of electrically conductive current paths to provide electrical coupling, at least one current path in the set can provide the coupling. In a subset of embodiments, a plurality or all of the electrically conductive current paths in the set may provide the coupling. Further, for one set of electrically conductive current paths to provide electrical coupling to another set of electrically conductive current paths, in certain embodiments at least one current path in the one set may couple to at least one current path in the other set. In a subset of embodiments, each electrically conductive current path in the one set may couple to a respective electrically conductive current path in the other set. Moreover, in various embodiments, either of the sets of electrically conductive current paths may act as fan-in or fan-out paths, in which the number of conductors in one set of electrically conductive current paths is greater or less than the number of conductors in the other set of electrically conductive current paths.

Figure 3:
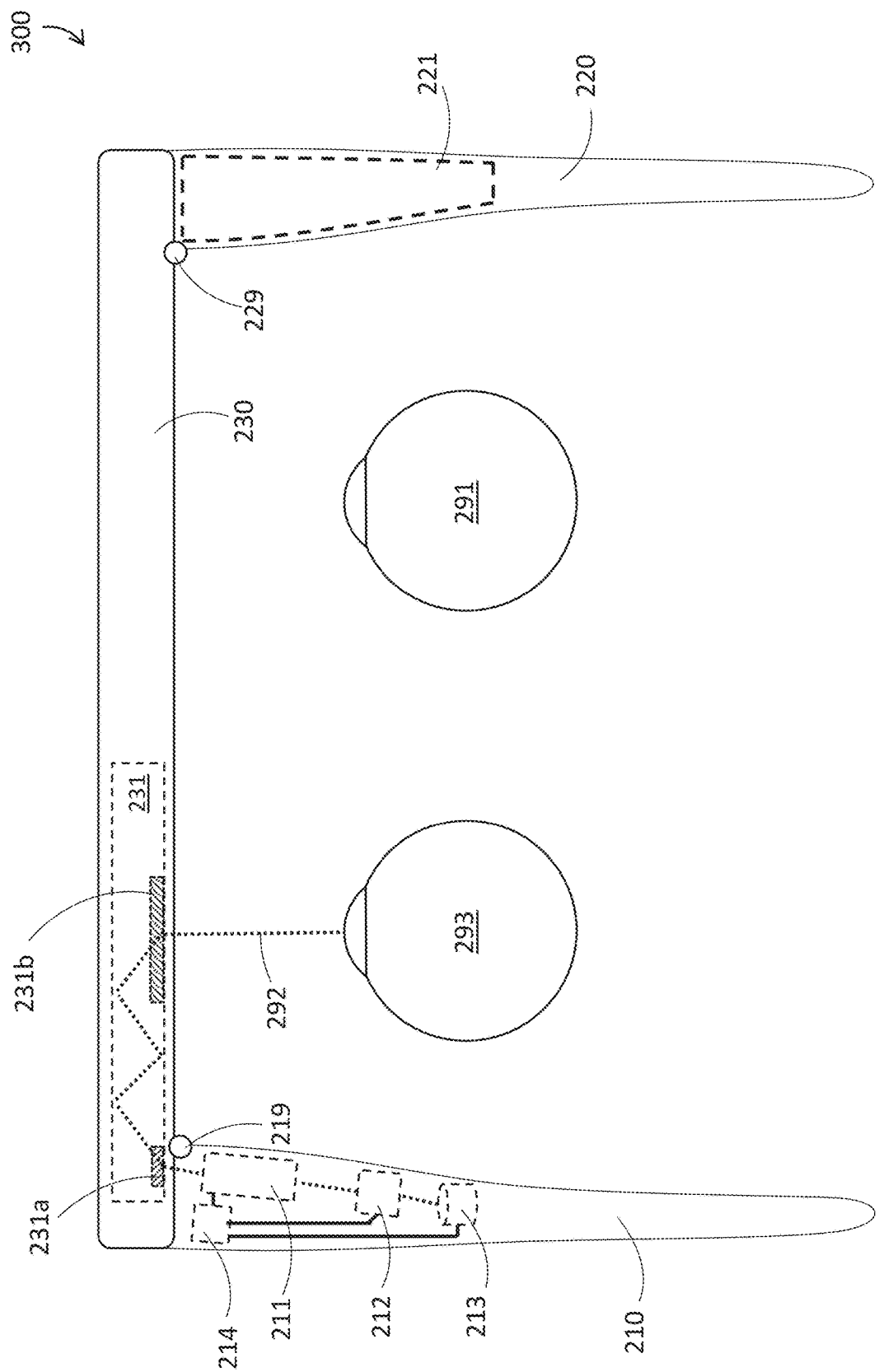
FIG. 3 is a top schematic view of another exemplary WHUD in accordance with one or more embodiments described herein.
Figure 5:
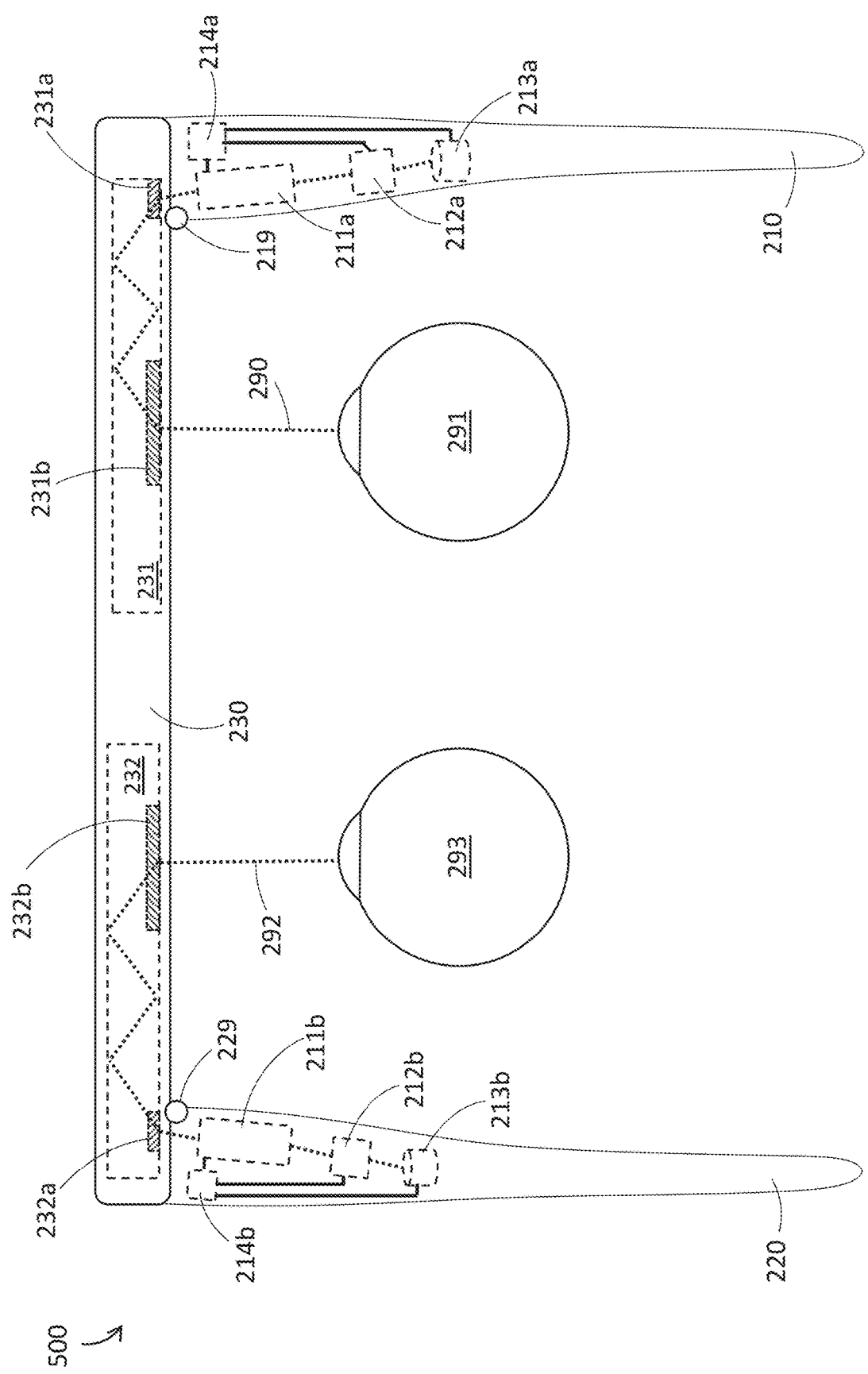
FIG. 5 is a top schematic view of yet another exemplary WHUD in accordance with one or more embodiments described herein.

Detailed implementations of how such a monocular arrangement can be implemented are discussed, for example, in U.S. Provisional Patent Application No. 62/862,355. However, such an arrangement is merely exemplary. As another example, in certain embodiments the orientation of WHUD 100 may be reversed, such that the display is presented to a left eye of a user instead of the right eye, as illustrated in FIG. 3. As another example, in certain embodiments second arm 120 may carry a light engine similar to light engine 111 carried by first arm 110, and front frame 130 may also carry an optical combiner similar to optical combiner 131, such that WHUD 100 presents a binocular display to both a right eye and a left eye of a user, as illustrated in FIG. 5.

Light engine 111 and optical combiner 131 can include any appropriate display architecture for outputting light and redirecting the light to form a display to be viewed by a user. For example, light engine 111, and any of the light engines discussed herein, may include at least one component selected from a group comprising at least: one of a projector, a scanning laser projector, a microdisplay, a white-light source, or any other display technology as appropriate for a given application. Optical combiner 131, and any of the optical combiners discussed herein, may include at least one optical component selected from a group comprising at least: a waveguide, at least one holographic optical element, at least one prism, a diffraction grating, at least one light reflector, a light reflector array, at least one light refractor, a light refractor array, or any other light-redirection technology as appropriate for a given application, positioned and oriented to redirect the display light towards the eye of the user. Optical combiner 131 can be carried by a lens, and the lens can be carried by front frame 130. For example, optical combiner 131 may be: a layer formed as part of a lens, a layer adhered to a lens, a layer embedded within a lens, a layer sandwiched between at least two lenses, or any other appropriate arrangement. A layer can for example be molded or cast, and/or may include a thin film and/or coating. Alternatively, optical combiner 131 may be a lens carried by front frame 130. Further, a "lens" as used herein can refer to a plano lens which applies no optical power and does not correct a user's vision, or a "lens" can be a prescription lens which applies an optical power to incoming light to correct a user's vision.

Exemplary display architectures may include for example scanning laser projector and holographic optical element combinations, side-illuminated optical waveguide displays, pin-light displays, or any other wearable heads-up display technology as appropriate for a given application. Exemplary display architectures are described in at least U.S. Non-Provisional patent application Ser. No. 15/145,576, U.S. Non-Provisional patent application Ser. No. 15/167,458, U.S. Non-Provisional patent application Ser. No. 15/046,254 now published as U.S. Pat. No. 9,989,764, U.S. Provisional Patent Application No. 62/754,339, U.S. Provisional Patent Application Ser. No. 62/782,918, U.S. Provisional Patent Application Ser. No. 62/789,908, U.S. Provisional Patent Application Ser. No. 62/845,956, U.S. Provisional Patent Application Ser. No. 62/791,514, and U.S. Provisional Patent Application Ser. No. 61/928,568 (now U.S. Non-Provisional patent application Ser. No. 14/599,279), the entireties of which are incorporated by reference herein.

The term "light engine" as used herein is not limited to referring to a singular light source, but can also refer to a plurality of light sources, and can also refer to a "light engine assembly". A light engine assembly may include some components which enable the light engine to function, or which improve operation of the light engine. As one example, a light engine assembly may include at least one light source, such as a laser or a plurality of lasers. The light engine assembly may additionally include electrical components such as driver circuitry to power the at least one light source. The light engine assembly may additionally include optical components such as collimation lenses, a beam combiner, or beam shaping optics. The light engine assembly may additionally include beam redirection optics such as least one MEMS mirror, which can be operated to scan light from at least one laser light source such as in a scanning laser projector. In the above example, the light engine assembly includes not only a light source, but also components which take the output from at least one light source and produce conditioned display light. All of the components in the light engine assembly can be included in a housing of the light engine assembly, or may be affixed to a substrate of the light engine assembly, such as a printed circuit board or similar.

The term "optical combiner" as used herein can also refer to an "optical combiner assembly". An optical combiner assembly may include additional components which support or enable functionality of the optical combiner. As one example, a waveguide combiner may be very thin, and consequently very fragile. To this end, it may be desirable to position the waveguide combiner within or on a transparent carrier, such as a lens. An optical combiner assembly may be a package which includes the transparent carrier and the waveguide positioned therein or thereon. In another example, a holographic combiner may include at least one thin holographic film. Such a holographic film can be embedded in or affixed to a transparent carrier, such as a lens. An optical combiner assembly may be a package which includes the transparent carrier and the at least one holographic film. As another example, an optical combiner assembly may include a prescription component, which applies an optical power to incoming light to compensate for imperfect user eyesight. Such a prescription component may include curvature applied to a transparent carrier itself, or may include a component additional to the transparent carrier, such as a clip-in or add-on lens.

Several exemplary WHUDs are described below, which further illustrate various features of the present disclosure. One skilled in the art will appreciate that the specific features described in the below implementations can be combined as appropriate, such that the present disclosure is not restricted to only the implementations discussed below, but also includes any reasonable combination of the features of the implementations discussed herein.

Figure 2A:
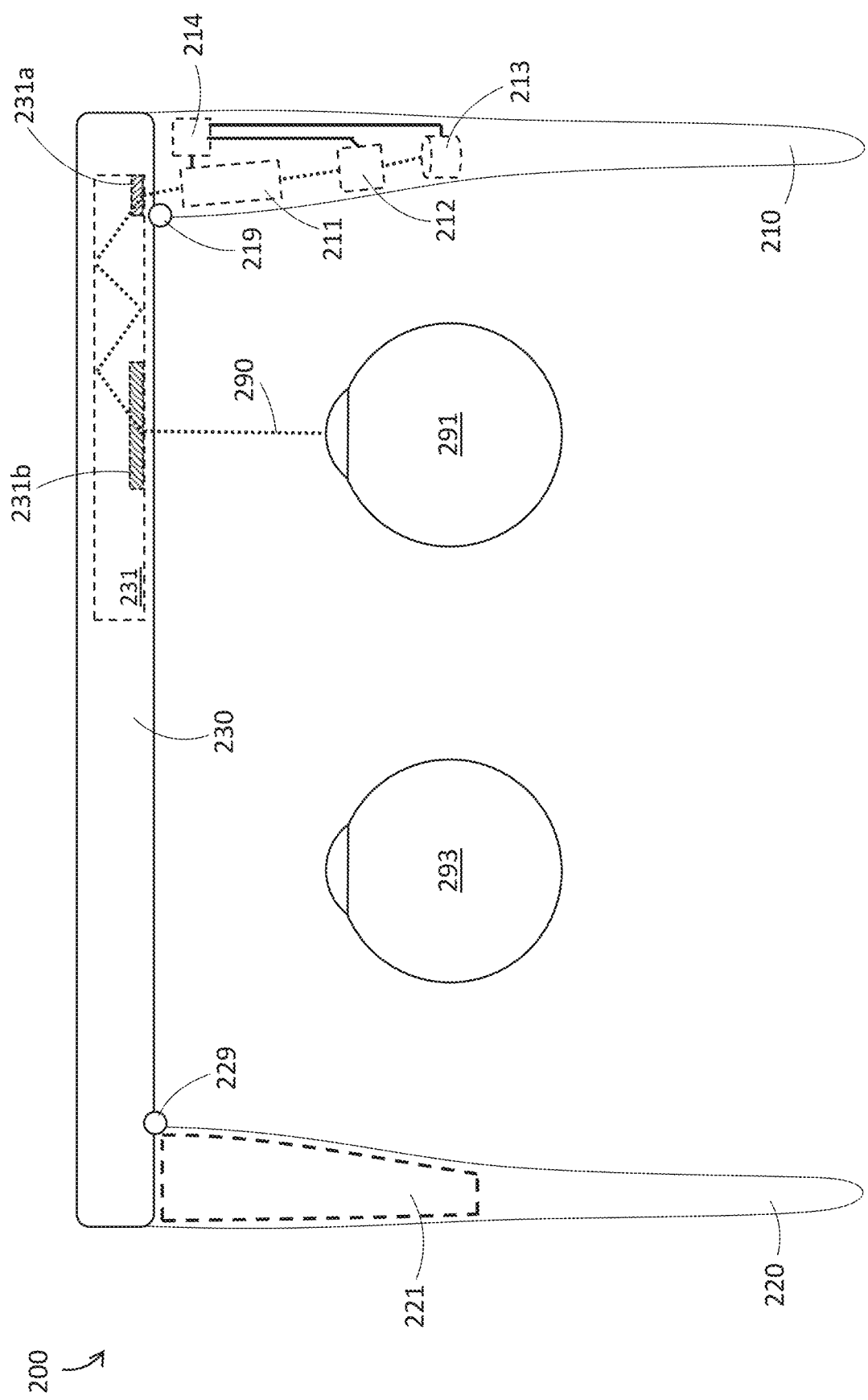
FIGS. 2A, 2B, and 2C are top schematic views of an exemplary WHUD in accordance with one or more embodiments described herein.
Figure 2B:
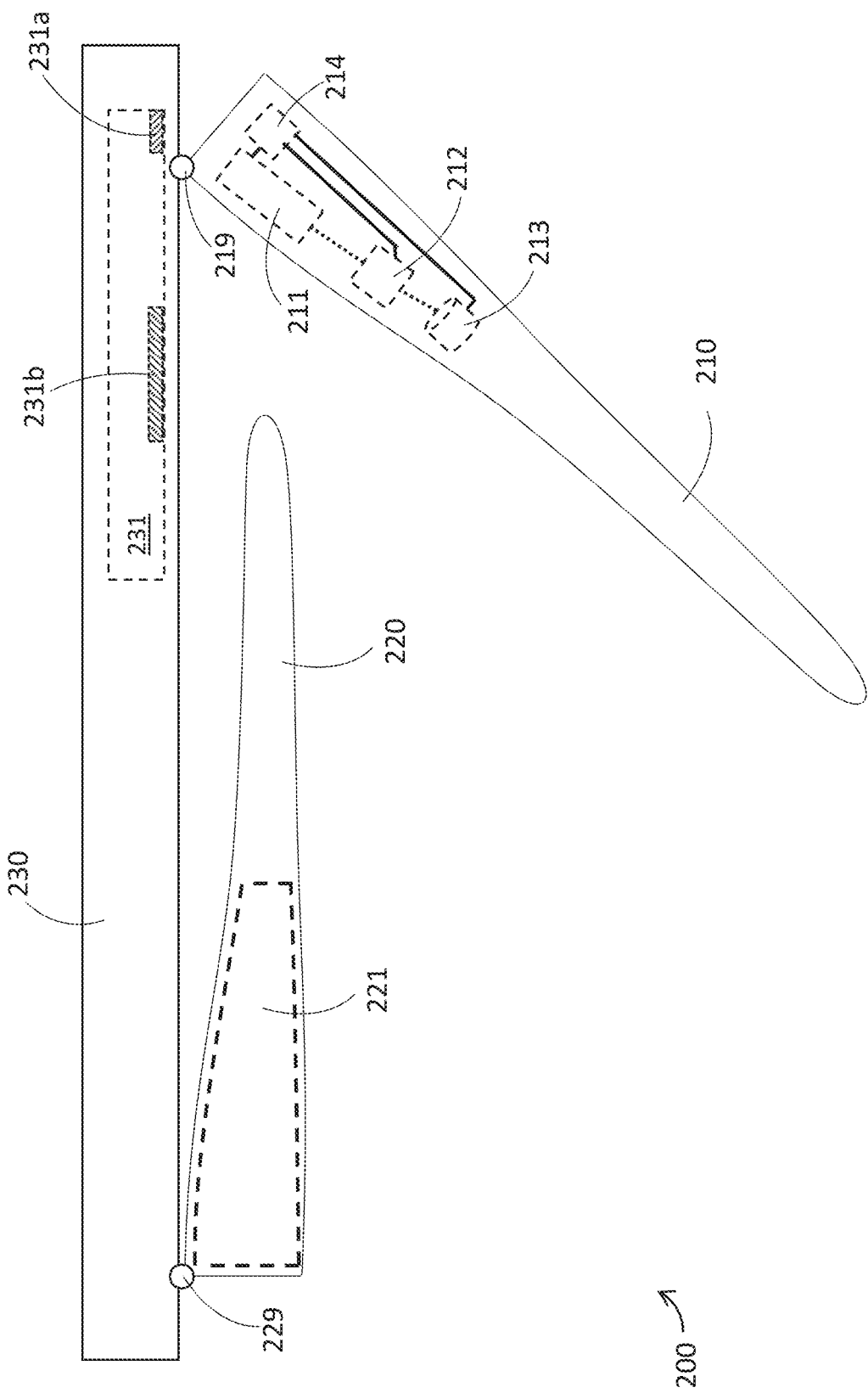
Figure 2C:
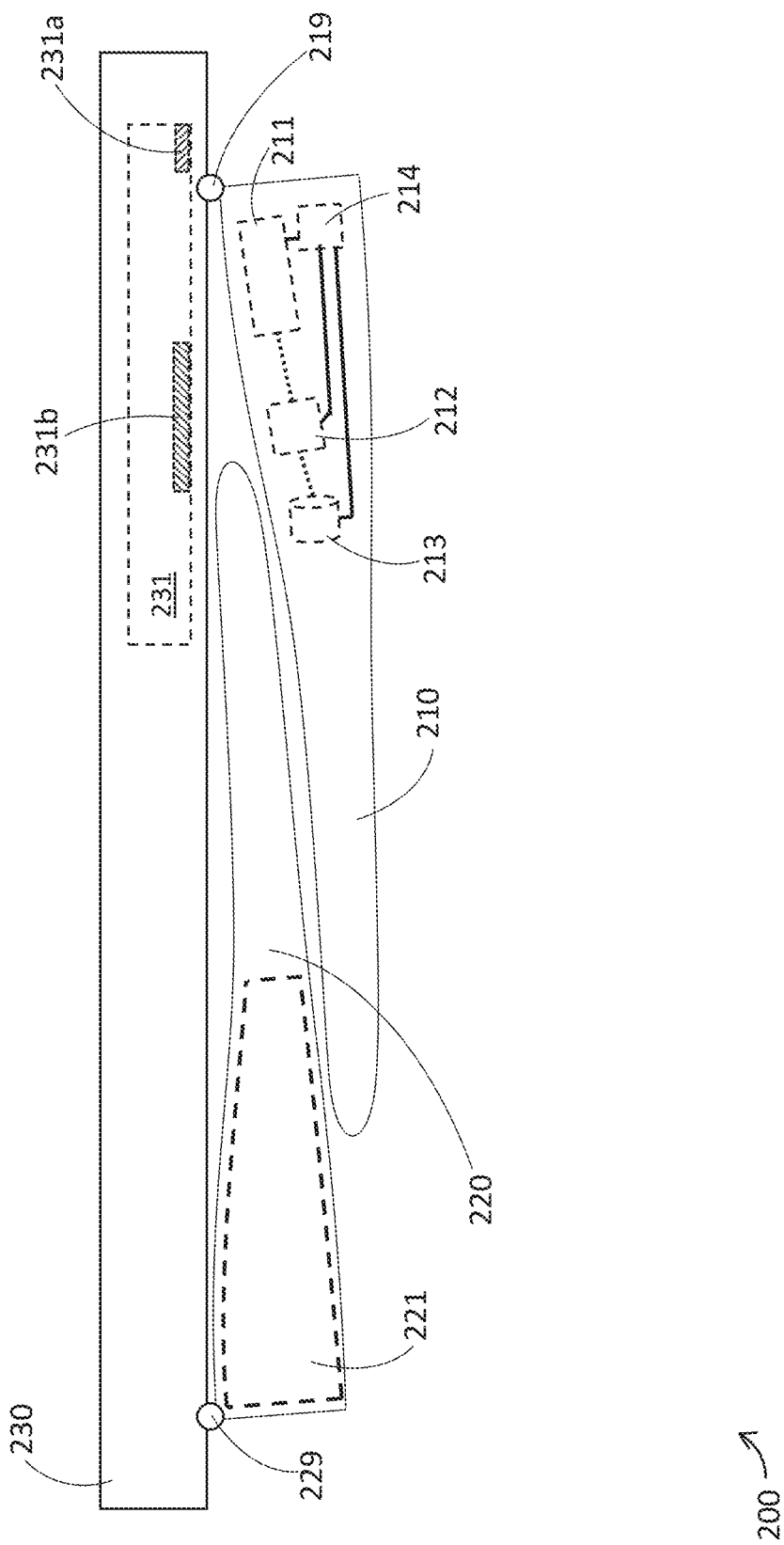

FIGS. 2A, 2B, and 2C are top schematic views of an exemplary WHUD 200 in accordance with the present disclosure. Similar to WHUD 100, WHUD 200 includes a first arm 210, a second arm 220, and a front frame 230. First arm 210 is coupled to front frame 230 by hinge 219, which allows first arm 210 to rotate relative to front frame 230. Second arm 220 is coupled to front frame 230 by hinge 229, which allows second arm 220 to rotate relative to front frame 230. FIG. 2A illustrates WHUD 200 in an unfolded configuration, in which first arm 210 and second arm 220 are rotated such that WHUD 200 can be worn on a head of a user, with first arm 210 positioned on a first side of the head of the user, second arm 220 positioned on a second side of the head of the user opposite the first side, and front frame 230 positioned on a front side of the head of the user. FIG. 2B illustrates WHUD 200 in a partial-folded configuration, in which first arm 210 and second arm 220 are rotated towards front frame 230. FIG. 2B illustrates a "partial-folded" configuration in the sense that first arm 210 is shown as being partway between the unfolded configuration and a fully folded configuration. This is to better illustrate the hinging action of WHUD 200. FIG. 2C illustrates WHUD 200 in a folded configuration, in which both first arm 210 and second arm 220 can be folded to be approximately parallel to front frame 230, such that WHUD 200 will be in a compact shape which fits conveniently in a slim rectangular, cylindrical, or oblong case.

In FIGS. 2A-2C, first arm 210 is coupled to light engine 211, at least one processor 212, at least one non-transitory processor-readable storage medium 213, and power supply circuit 214. Second arm 220 is coupled to power source 221. Front frame 230 is coupled to optical combiner 231 and at least one set of electrically conductive current paths (not illustrated to avoid clutter). The at least one set of electrically conductive current paths provide electrical coupling between power source 221 and electrical components carried by first arm 210, such as light engine 211, at least one processor 212, at least one non-transitory processor-readable storage medium 213. Such electrical coupling may be provided indirectly, such as through power supply circuit 214, or may be provided directly from power source 221 to each electrical component in first arm 210. Detailed implementations for the electrically conductive current paths mentioned herein can be found in at least U.S. Provisional Patent Application No. 62/862,355.

Power supply circuit 214 can provision power from power source 221 to each of light engine 211, at least one processor 212, and non-transitory processor-readable storage medium 213, and any other electrical components that may be carried by first arm 210, as shown by solid lines connecting power supply circuit 214 to other components. Power supply circuit 214 can optionally modulate the power from power source 221, such as by modulating the voltage or current of the power to be delivered to each of the electrical components. Each electrical component may receive the same modulated power signal from power supply circuit 214, each component may receive a different modulated power signal from power supply circuit 214, or some components may receive the same modulated power signal from power supply circuit 214 while other components receive a different modulated power signal from power supply circuit 214.

In some implementations, it is possible that when WHUD 200 is not in the unfolded configuration, the electrical coupling between power source 221 and the electrical components in first arm 210 can be disconnected. For example, WHUD 200 may include a safety switch which disconnects or disables the provision of power from power supply 221. As another example, at least one of the set of electrically conductive current paths can be physically disconnected from other electrically conductive current paths, electrical components, or power source 221 when WHUD 200 is not in the unfolded configuration.

The at least one processor 212 can be communicatively coupled to each of the electrical components in WHUD 200 as shown by dashed lines connecting components, including but not limited to light engine 211, at least one non-transitory processor readable storage medium 213, and power supply circuit 214. The at least one processor 212 can be any suitable component which can execute instructions or logic, including but not limited to a micro-controller, microprocessor, multi-core processor, integrated-circuit, ASIC, FPGA, programmable logic device, or any appropriate combination of these components. Non-transitory processor-readable storage medium 213 may store processor readable instructions thereon, which when executed by at least one processor 212 can cause light engine 211 to output light 290 representative of display content to be viewed by a user. The output light 290 representative of display content to be viewed by a user is redirected by optical combiner 231 towards an eye 291 of the user, such that the user can see the display content. In the case of WHUD 200, optical combiner 231 is a waveguide combiner which includes an incoupler 231a and an outcoupler 231b. Light 290 from light engine 211 impinges on incoupler 231a and is redirected into waveguide combiner 231, where the light 290 is guided through the waveguide by total internal reflection. Subsequently, light 290 in waveguide combiner 231 impinges on outcoupler 231b, which redirects light 290 out of the waveguide and towards an eye 291 of a user. One skilled in the art will appreciate that waveguide combiner 231 is an exemplary display architecture, and the present disclosure is not limited to this display architecture, as will be discussed with reference to FIG. 4. Exemplary waveguide and lightguide based WHUD display architectures are described in at least U.S. Provisional Patent Application No. 62/754,339, U.S. Provisional Patent Application Ser. No. 62/782,918, U.S. Provisional Patent Application Ser. No. 62/789,908, U.S. Provisional Patent Application Ser. No. 62/845,956, and U.S. Provisional Patent Application Ser. No. 62/791,514.

Further, at least one non-transitory processor-readable storage medium 213 may store processor readable instructions thereon, which when executed by at least one processor 212 can cause the at least one processor to execute any number of functions, including receiving user input, managing user interfaces, generating display content to be presented to a user, receiving and managing data from any sensors carried by WHUD 200, receiving and processing external data and messages, and/or any other functions as appropriate for a given application. The at least one non-transitory processor-readable storage medium 213 can be any suitable component which can store instructions, logic, or programs, including but not limited to non-volatile or volatile memory, read only memory (ROM), random access memory (RAM), FLASH memory, registers, magnetic hard disk, optical disk, or any combination of these components.

FIG. 3 is a top schematic view of a WHUD 300. WHUD 300 can be similar in at least some respects to WHUD 200 of FIGS. 2A-2C. Unless context clearly dictates otherwise, the description relating to components of WHUD 200 can be applicable to similarly numbered components of WHUD 300. Further, WHUD 300 can transition between a folded configuration and an unfolded configuration similarly to WHUD 200 as illustrated in FIGS. 2A-2C.

One difference between WHUD 300 and WHUD 200 is that the orientation of the components in WHUD 300 are reversed relative to WHUD 200. In particular, in WHUD 200, first arm 210 is to be positioned on a right side of the head of a user when worn and second arm 220 is to be positioned on a left side of the head of the user when worn. On the other hand, in WHUD 300, first arm 210 is to be positioned on a left side of the head of a user when worn and second arm 220 is to be positioned on a right side of the head of the user when worn. Light engine 211 can output display light 292, which is redirected by optical combiner 231 towards a left eye 293 of a user, instead of right eye 291 as shown in FIG. 2A. The reversal of the orientation of a WHUD described with reference to WHUD 300 of FIG. 3 is fully applicable to any of the WHUDs described herein.

Figure 4:
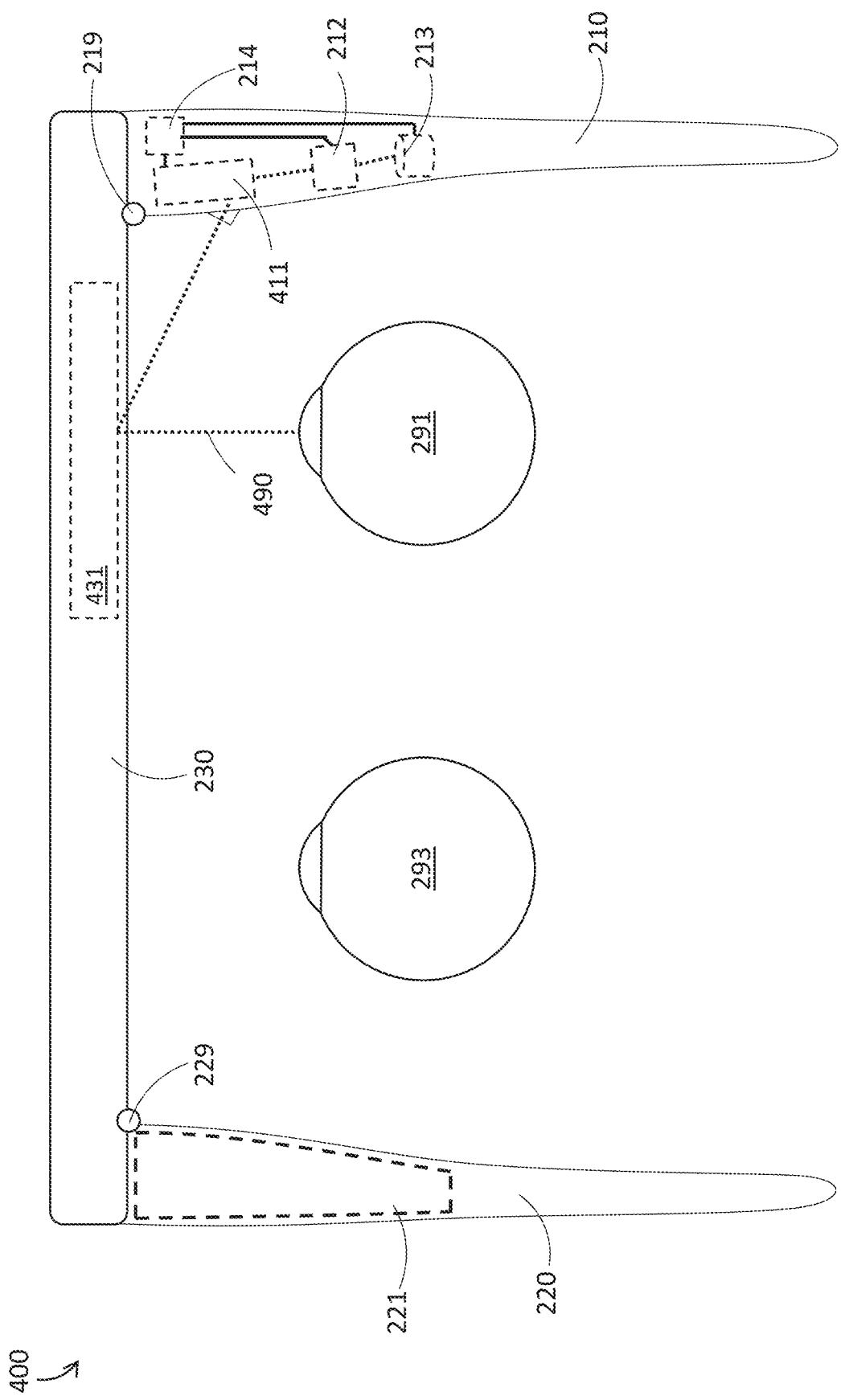
FIG. 4 is a top schematic view of yet another exemplary WHUD in accordance with one or more embodiments described herein.

FIG. 4 is a top schematic view of a WHUD 400. WHUD 400 can be similar in at least some respects to WHUD 200 of FIGS. 2A-2C. Unless context clearly dictates otherwise, the description relating to components of WHUD 200 can be applicable to similarly numbered components of WHUD 400. Further, WHUD 400 can transition between a folded configuration and an unfolded configuration similarly to WHUD 200 as illustrated in FIGS. 2A-2C.

One difference between WHUD 400 and WHUD 200 is that WHUD 400 uses a different display architecture from WHUD 200. In particular, in WHUD 400, light engine 411 outputs display light 490 across a temple region of the WHUD towards optical combiner 431 when first arm 210 is in an unfolded configuration. Light engine 411 can be similar to light engine 211, and optical combiner 431 can include a redirector which redirects display light 490 towards an eye 291 of a user when WHUD 400 is worn on a head of the user. In one exemplary implementation, light engine 411 can be a scanning laser projector which scans display light 490 as laser light onto optical combiner 431. Optical combiner 431 can be a holographic combiner, which includes at least one hologram responsive to a narrow wavelength bandwidth of light which encompasses light output by light engine 431, to redirect laser light 490 towards eye 291 with minimal influence on environmental light passing through optical combiner 431. Exemplary holographic display architectures are described in at least U.S. Non-Provisional patent application Ser. No. 15/167,458, U.S. Non-Provisional patent application Ser. No. 15/046,254 now published as U.S. Pat. No. 9,989,764.

FIG. 5 is a top schematic view of a WHUD 500. WHUD 500 can be similar in at least some respects to WHUD 200 of FIGS. 2A-2C. Unless context clearly dictates otherwise, the description relating to components of WHUD 200 can be applicable to similarly numbered components of WHUD 500. Further, WHUD 500 can transition between a folded configuration and an unfolded configuration similarly to WHUD 200 as illustrated in FIGS. 2A-2C.

One difference between WHUD 500 and WHUD 200 is that WHUD 500 has binocular display capabilities. That is, WHUD 500 can present a display to both eye 291 and eye 293 of a user. This can be achieved by including a first optical combiner 231 in front of a first eye 291 of the user, and positioning a second optical combiner 232 in front of a second eye 293 of the user. A first light engine 211a carried by first arm 210 can output display light 290 to first optical combiner 231, which can redirect light 290 towards first eye 290 of a user to form a display seen by first eye 291. A second light engine 211b carried by second arm 220 can output display light 292 to second optical combiner 232, which can redirect light 292 towards second eye 293 of a user to form a display seen by second eye 293.

Optical combiner 231 in FIG. 5 can be similar to optical combiner 231 in FIG. 2A, including incoupler 231a and outcoupler 231b, such that optical combiner 231 is a waveguide combiner which redirects display light towards an eye of the user. Further, optical combiner 232 can be similar to optical combiner 231 described with reference to FIG. 3; incoupler 232a can be similar to incoupler 231a describe with reference to FIG. 3; and outcoupler 232b can be similar to outcoupler 231b described with reference to FIG. 3. In this way, optical combiner 232 can be a waveguide combiner which redirects display light towards another eye of the user.

However, in alternative implementations, one or both of optical combiner 231 and optical combiner 232 may be replaced with respective optical combiners based on different display architectures, such as optical combiner 431 described with reference to FIG. 4.

Optionally, each of first arm 210 and second arm 220 may carry any of a respective processor, a respective non-transitory processor-readable medium, and a respective power supply circuit. This is shown in FIG. 5, in that first arm 210 includes at least one processor 212a, at least one non-transitory processor-readable medium 213a, and a power supply circuit 214a, and in that second arm 220 includes at least one processor 212b, at least one non-transitory processor readable medium 213b, and power supply circuit 214b. The descriptions above regarding at least one processor 212 are fully applicable to at least one processor 212a and at least one processor 212b. The descriptions above regarding at least one non-transitory processor-readable medium 213 are fully applicable to at least one non-transitory processor-readable medium 213a and at least one non-transitory processor-readable medium 213b. The descriptions above regarding power supply circuit 214 are fully applicable to power supply circuit 214a and power supply circuit 214b.

In other implementations, WHUD 500 may include a common processor, common non-transitory processor-readable storage medium, and common power supply circuit which are shared by light engine 211a and light engine 211b.

Figure 6:
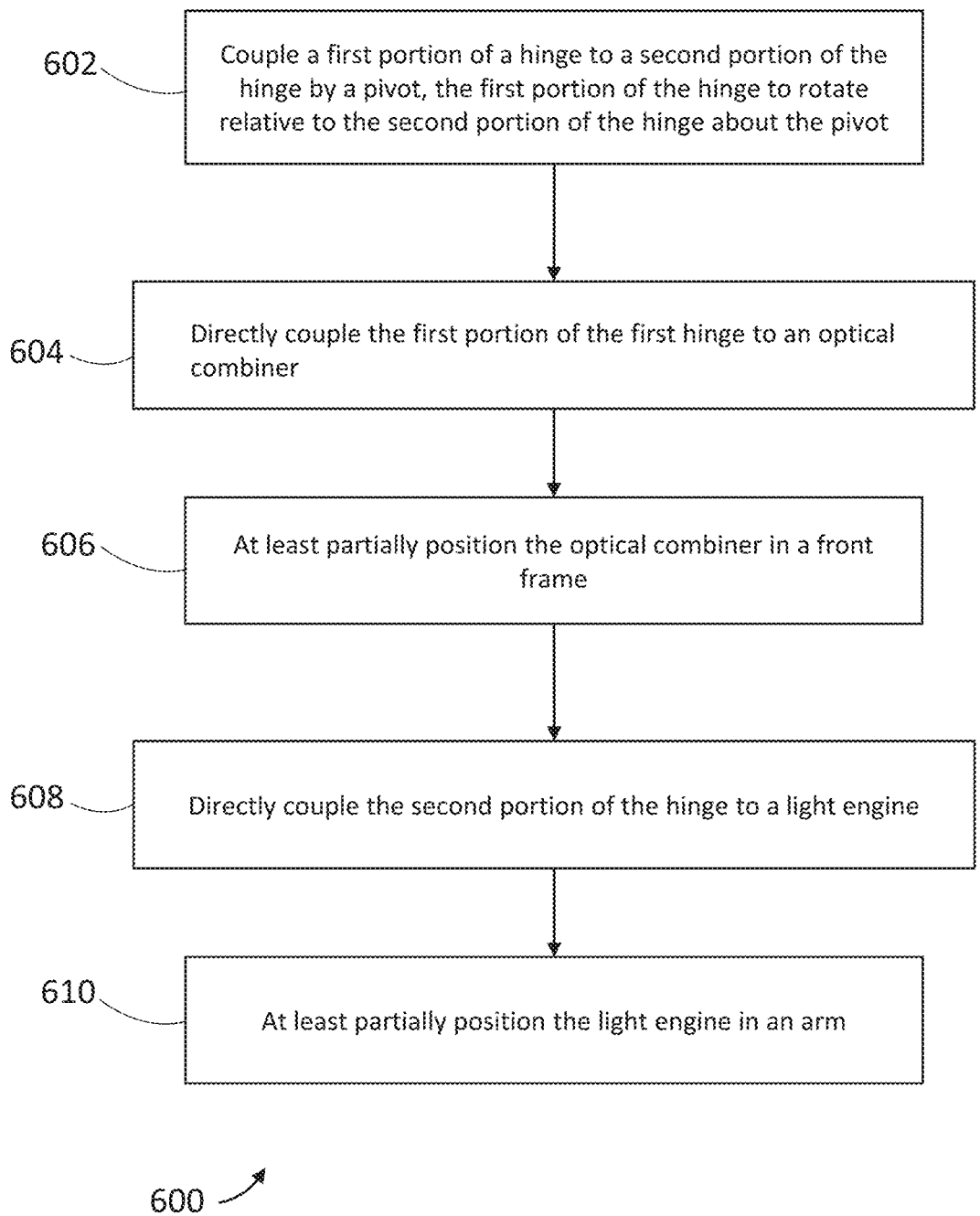
FIG. 6 is a flowchart of an exemplary method of manufacturing a WHUD in accordance with one or more embodiments described herein.

FIG. 6 is a flowchart which illustrates an exemplary method 600 for manufacturing a wearable heads-up display. Method 600 includes at least acts 602, 604, 606, 608, and 610. Further, although FIG. 6 shows method 600 as being performed in the order of act 602, act 604, act 606, act 608, and act 610, the order of acts may be changed as appropriate for a given application. Further, acts may be removed or additional acts may be added as appropriate for a given application.

In act 602, a first portion of a hinge is coupled to a second portion of the hinge by a pivot. The first portion of the hinge will be rotatable relative to the second portion of the hinge about the pivot. In act 604, the first portion of the hinge is directly coupled to an optical combiner. In act 606, the optical combiner is at least partially positioned in a front frame. In act 608, the second portion of the hinge is directly coupled to a light engine. In act 610, the light engine is at least partially positioned in an arm.

Method 600, and products resulting therefrom, are discussed in detail below with reference to at least FIGS. 7-17.

Figure 7A:
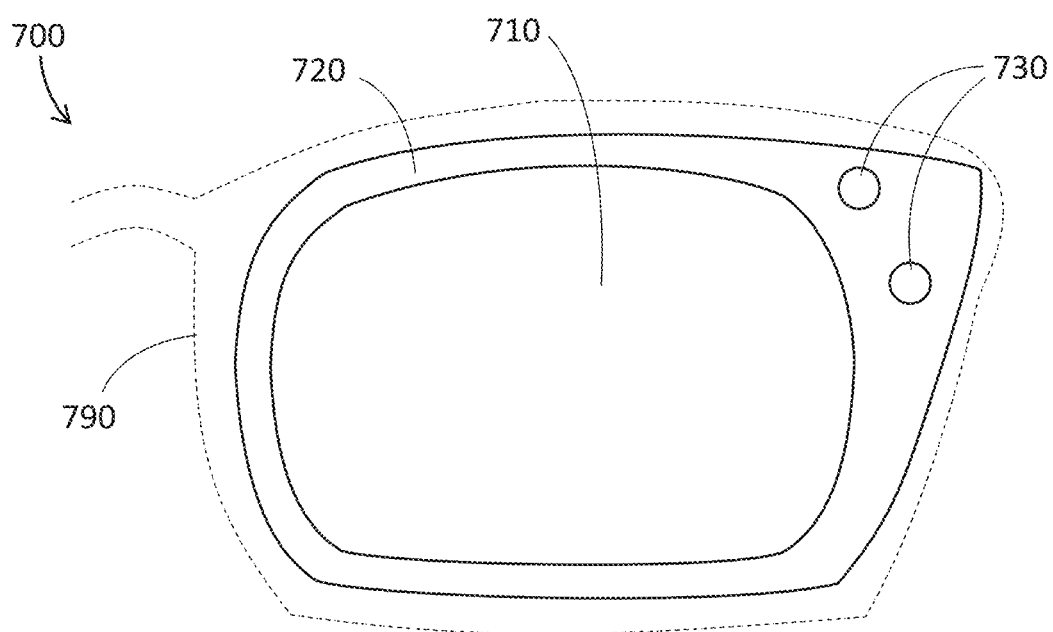
FIGS. 7A, 7B, 7C, and 7D are exemplary front-views of exemplary optical combiner and front frame structures in accordance with one or more embodiments described herein.

FIG. 7A is an orthogonal view of an optical combiner 700 in accordance with one embodiment of the present disclosure. Optical combiner 700 can include at least a viewing region 710, a peripheral region 720, and an interface 730. Optical combiner 700 can be at least partially positioned in a front frame 790. An outline of front frame 790 in FIG. 7A is shown in dashed lines, with the features of optical combiner 700 visible through front frame 790 to more clearly illustrate features of optical combiner 700.

Viewing region 710 can be a region of optical combiner 710 which is intended to be visible to a user when in use, and/or visible to onlookers other than the user. Peripheral region 720 can include at least one region of optical combiner 700 which can be positioned within at least a portion of a front frame of a WHUD. Interface 730 can include a region or structure of optical combiner 700 which can be coupled to a hinge of a WHUD.

As an example, viewing region 710 can be a plano or prescription lens to be positioned in front of an eye of the user when in use. Viewing region 710 can also include features which enable optical combiner 700 to redirect light from a light engine towards an eye of a user, to form a display. For example, optical combiner 700 may be a waveguide combiner such as waveguide combiner 231 discussed above. Peripheral region 720 may include at least a portion of the waveguide and incoupler 231a, and viewing region 710 may include at least a portion of the waveguide and outcoupler 231b. In this way, light from a light engine may be coupled into the waveguide at peripheral region 720 of the optical combiner, redirected by a waveguide to viewing region 710, where the light is then redirected out of the waveguide towards an eye of a user, similarly as described above with reference to FIGS. 2A and 3. Further in some implementations, it is possible for optical combiner 700 to form a display using features entirely positioned within the viewing region 710. As an example, viewing region 710 may be similar to optical combiner 431 described above with reference to FIG. 4. That is, at least one hologram may be positioned in viewing region 710, which receives display light projected from a light engine across a temple area, and redirects the received display light towards an eye of the user in use, similarly as described above with reference to FIG. 4.

In some implementations, peripheral region 720 may be structurally different from viewing region 710. For example, viewing region 710 may be a planar structure, or a smoothly curved lens structure, but peripheral region 720 may comprise at least one ridge, groove, tab, planar area, or other structure which is non-continuous with the shape of viewing region 710. As one example, viewing region 710 may comprise a smoothly curved lens structure, whereas peripheral region 720 may comprise a planar structure to which a front frame is to be coupled. In other implementations, peripheral region 720 may be structurally continuous with viewing region 710. For example, the entirety of viewing region 710 and peripheral region 720 may comprise a continuous, smooth, curved lens structure, or a continuous planar structure.

Interface 730 as illustrated in FIG. 7A includes two receptacles which can receive corresponding fasteners to couple the optical combiner 700 to a hinge. However, interface 730 is not limited to this structure. For example, interface 730 may comprise only a single receptacle. Further, each receptacle does not need to be circular, but may comprise other shapes like square, rectangular, pentagonal, hexagonal, star-shaped (e.g. Torx® or hexalobular internal shaped), trapezoidal, cross-shaped, oblong, asymmetrical, or any other appropriate shape. Further still, instead of or in addition to a receptacle, interface 730 may include at least one protrusion, tab, clip, bracket or other appropriate structure. Detailed implementations of interfaces between an optical combiner and a hinge are discussed below with reference to FIGS. 8A, 8B, and 9-15.

Figure 7B:
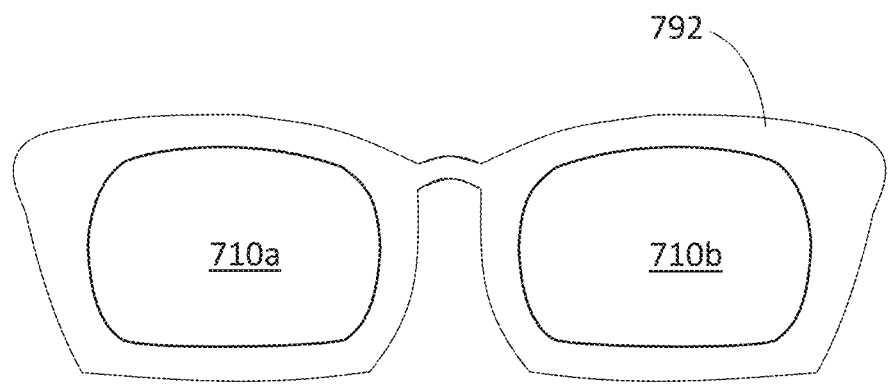
Figure 7C:
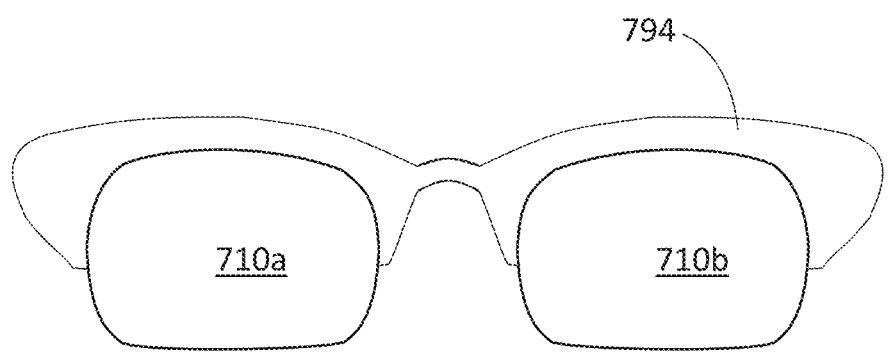
Figure 7D:
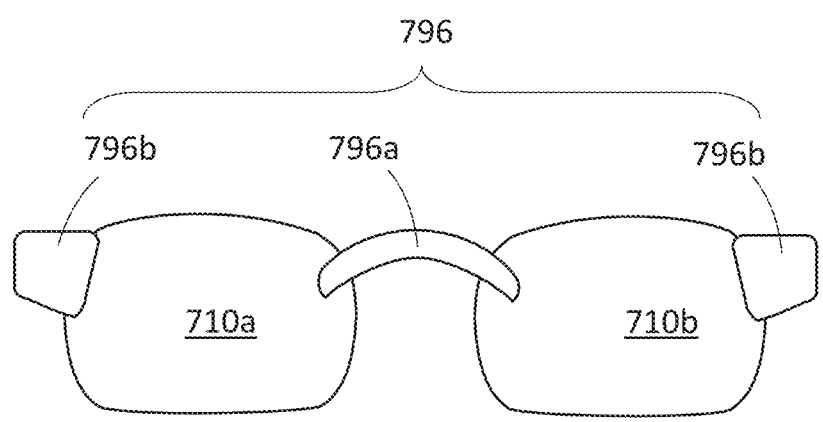

Although the embodiment of FIG. 7A shows optical combiner 700 as being fully surrounded by a front frame 790, some embodiments may utilize alternative configurations. FIGS. 7B-7D are orthogonal views which illustrate several front frame structures, as discussed below.

FIGS. 7B, 7C, and 7D each illustrate an exemplary front frame which is coupled to at least one optical combiner similar to optical combiner 700 described above. In particular, each of FIGS. 7B, 7C, and 7D show a first viewing region 710a to be positioned in front of one eye of a user, and a viewing region 710b to be positioned in front of another eye of the user. In some implementations, both viewing region 710a and viewing region 710b can include features which direct display light from a light engine towards a respective eye of the user, thus forming a binocular display such as described with reference to FIG. 5 above. In other implementations, only one of viewing region 710a and viewing region 710b may include features which direct display light from a light engine towards a respective eye of the user, thus forming a monocular display such as illustrated in FIGS. 2A-2C, 3, and 4 discussed above. In the case of monocular displays, the viewing region which does not direct light to an eye of the user can still be a transparent combiner, such as a plano or prescription curved lens, or a planar combiner.

FIG. 7B illustrates a front frame 792 which completely surrounds each of viewing region 710a and viewing region 710b, which can also be referred to as "full-frame".

FIG. 7C illustrates a front frame 794 which only partially surrounds each of viewing region 710a and viewing region 710b. As can be seen from FIG. 7C, in areas of the optical combiners which are not encompassed by front frame 794, there are no peripheral regions akin to peripheral region 720 nor any interfaces akin to interface 730. This is because it is generally more aesthetically pleasing for such peripheral regions and interfaces to be hidden by the front frame. Consequently, FIG. 7C may include peripheral regions akin to peripheral region 720, and interfaces akin to interface 730 in areas that will be hidden within front frame 794. Eyeglasses which include a front frame such as front frame 794 can be referred to as "partial frame" or "partial-rim".

FIG. 7D illustrates a minimalistic front frame 796, which includes separate components: a nose bridge 796a and two arm connectors 796b. Nose bridge 796a can couple a pair of optical combiners together such that a viewing region 710a and a viewing region 710b will be positioned in front of respective eyes of a user. Arm connectors 796b can each couple to a respect arm to be positioned on opposite sides of a head of the user. In some implementations, each arm connector 796b may cover an interface akin to interface 730 which couples to a hinge. In such implementations, each arm connector 796b would act as a cladding which covers the hinge and interface. However, in other implementations, arm connectors 796b may instead comprise the hinge itself, such that no cladding is needed. In such implementations, The hinge and interface itself may be designed to be aesthetically pleasing without the need for cladding, or the hinge and interface may be deliberately exposed to give the WHUD a technical and/or edgy appearance.

Figure 8A:
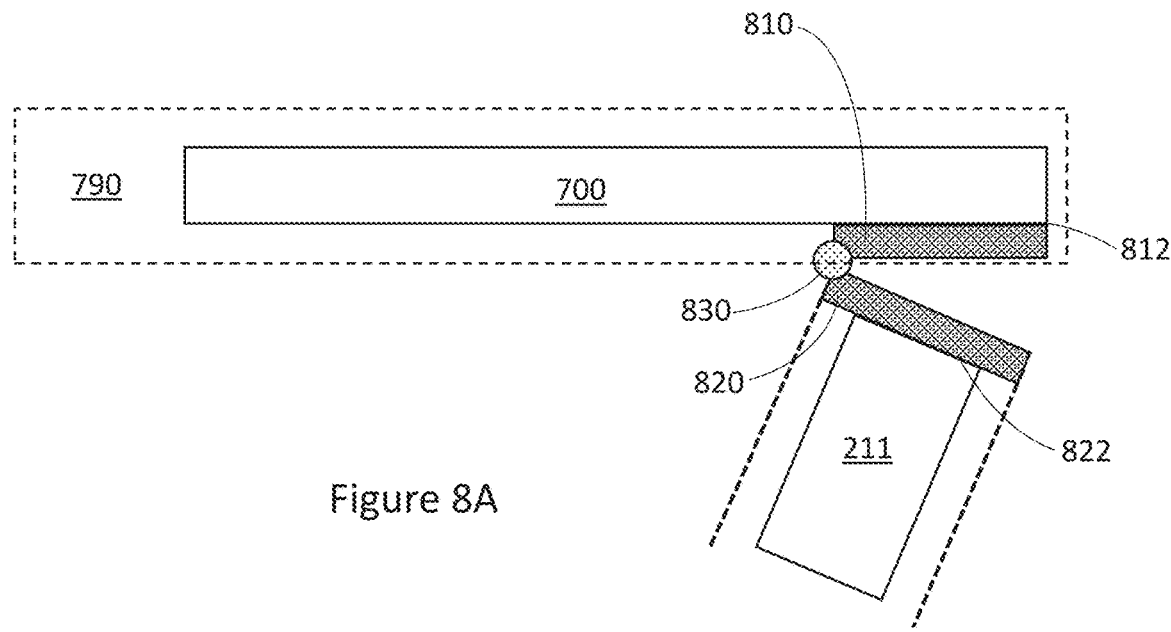
FIGS. 8A and 8B are top cutaway views of exemplary hinge structures in accordance with one or more embodiments described herein.
Figure 8B:
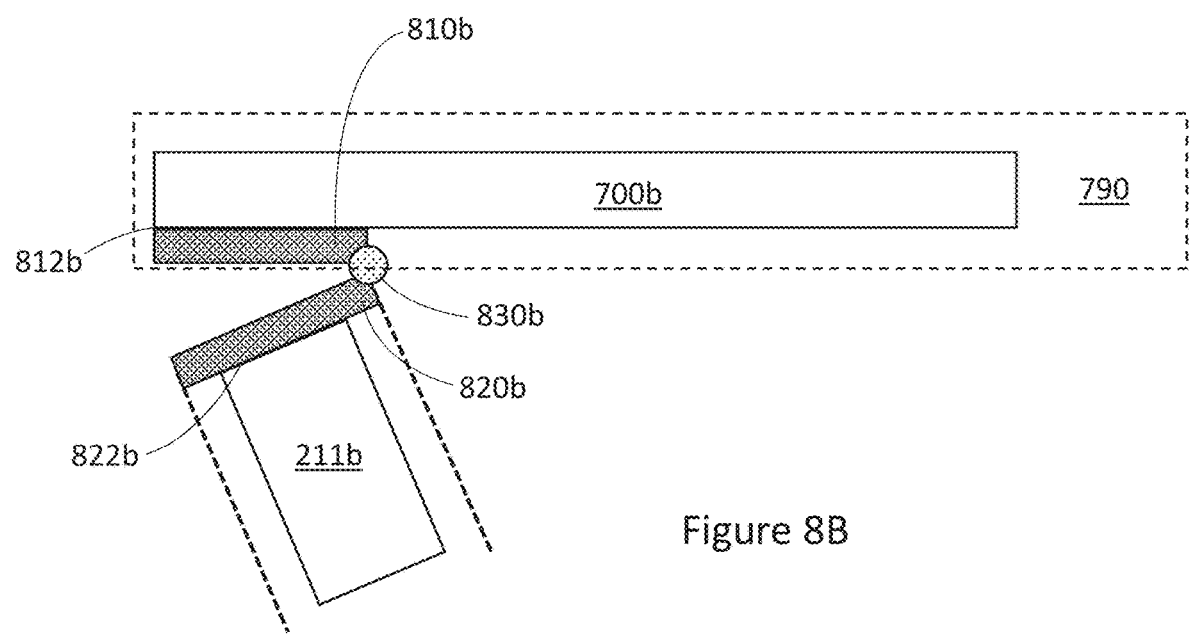

FIGS. 8A, 8B, and 9-15 are top cutaway views of several implementations of coupling an optical combiner and light engine about a hinge, in accordance with method 500. Each of the implementations shown in FIGS. 8A and 9-15 illustrate an optical combiner, arm, and hinge which are to be positioned towards a right side of a user's head in user. However, each of the implementations shown in FIGS. 8A and 9-15 may also be reversed in orientation to achieve an optical combiner, arm, and hinge which are to be positioned towards a left side of a user's head in use, as illustrated in FIG. 8B. In FIGS. 8A, 8B, and 9-15, front frame 790 is shown in dashed lines, with features of components in front frame 790 visible therethrough, in order to more clearly show the features of components in front frame 790.

FIG. 8A is a top cutaway view which illustrates a hinge comprising a first portion 810 and a second portion 820. The first portion 810 is coupled to the second portion by a pivot 830, and the first portion 810 can rotate relative to the second portion 820 about pivot 830. First portion 810 is directly coupled to an optical combiner 700 by a first interface 812, and second portion 820 is directly coupled to a light engine 211 by a second interface 822.

In the above described arrangement, the optical combiner and light engine are directly coupled to respective portions of a hinge, such that the only point of motion between the optical combiner and the light engine is rotation of the hinge. Further, by directly coupling the optical combiner and the light engine to the hinge, potential shifting between components, as well as potential manufacturing misalignment, can be reduced compared to an arrangement where intermediate components are used to couple the hinge to the light engine and the optical combiner. As an example, in an arrangement where a first portion of a hinge is coupled to a front frame which is in turn coupled to an optical combiner, and a second portion of the hinge is coupled to an arm which in turn is coupled to a light engine, there are many couplings which can cause shifting or misalignment between the optical combiner and the light engine. For example, there can be misalignment in the coupling between the optical combiner and the front frame, the coupling between the front frame and the first portion of the hinge, the coupling between the first portion of the hinge and the second portion of the hinge, the coupling between the second portion of the hinge and the arm, and the coupling between the arm and the light engine. Thus, in such an implementation, there are at least five different couplings which can be a source of shifting and misalignment between the optical combiner and the light engine.

In contrast, in certain embodiments of techniques described herein, by directly coupling the first portion of the hinge to the optical combiner, and directly coupling the second portion of the hinge to the light engine, at least two intermediate couplings can be eliminated. This may reduce the possibility and the range of shifting and misalignment between the optical combiner and the light engine.

FIG. 8B is a top cutaway view which illustrates a hinge comprising a first portion 810*b* and a second portion 820*b*. The first portion 810*b* is coupled to the second portion by a pivot 830*b*, and the first portion 810*b* can rotate relative to the second portion 820*b* about pivot 830*b*. First portion 810*b* is directly coupled to an optical combiner 700*b* by a first interface 812*b*, and second portion 820*b* is directly coupled to a light engine 211*b* by a second interface 822*b*. Several features of FIG. 8B are similar to features in FIG. 8A, as well as FIGS. 9-17 discussed below. For example, first portion 810*b* is similar to first portion 810, second portion 820*b* is similar to second portion 820, pivot 830*b* is similar to pivot 830, optical combiner 700*b* is similar to optical combiner 700, first interface 812*b* is similar to first interface 812, second interface 822*b* is similar to second interface 822, and light engine 211*b* is similar to light engine 211. Unless context clearly dictates otherwise, the descriptions herein related to any of the components of FIGS. 8A and 9-17 can also be applicable to similar components in FIG. 8B. One difference between the components of FIG. 8B and similar components in FIGS. 8A and 9-17 is that the components of FIG. 8B can be reversed in orientation, such that the hinge of FIG. 8B can be positioned towards a left side of a user's head, as opposed to a right side as in the implementations of FIGS. 8A and 9-17. Such a reversed orientation as in FIG. 8B may be an alternative to the orientations shown in FIGS. 8A and 9-17, resulting in a WHUD which includes a monocular display to be positioned in front of a different eye of a user from the implementations shown in FIGS. 8A and 9-17. Such a reversed orientation as in FIG. 8B may also be used in combination with any of the orientations shown in FIGS. 8A and 9-17, resulting in a WHUD which includes a binocular display which can be positioned in front of both of a user's eyes.

FIGS. 9-15 illustrate several detailed implementations for first interface 812 and first interface 822.

Figure 9:
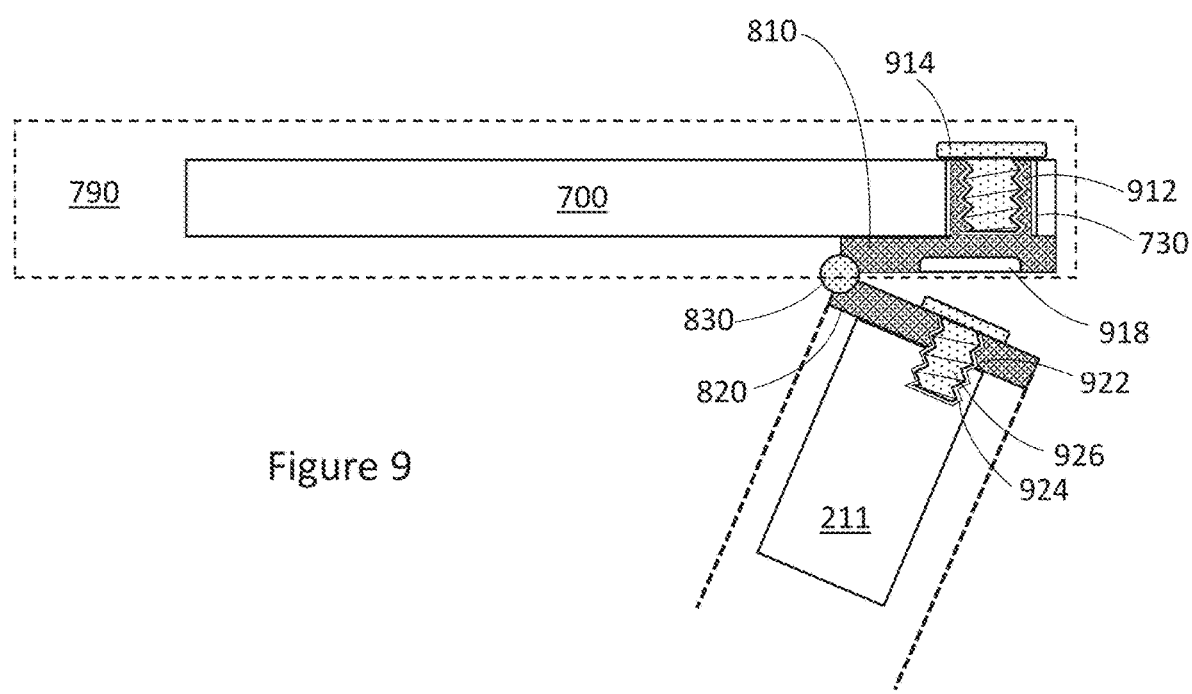
FIG. 9 is a top cutaway view of another exemplary hinge structure in accordance with one or more embodiments described herein.

FIG. 9 is a top cutaway view of a hinge similar to the hinge described with reference to FIG. 8. Unless context clearly dictates otherwise, the descriptions of components of FIG. 8 are fully applicable to similarly numbered components in FIG. 9.

In FIG. 9, first portion 810 is directly coupled to an optical combiner 700 by at least one mechanical fastener. Second portion 820 is directly coupled to a light engine 211 by at least one mechanical faster. In particular, first portion 810 includes at least one threaded receptacle 912, which fits within a corresponding receptacle of interface 730 of optical combiner 700. A screw 914 can be threaded into threaded receptacle 912, and a head of screw 914 can be wider than the respective receptacle of interface 730. In this way, when screw 914 is threaded into threaded receptacle 912, first portion 810 is affixed directly to optical combiner 700. Further, second portion 820 can include a receptacle 922 therein (optionally threaded), and light engine 211 can include a threaded receptacle 924 therein. A screw 926 can be inserted through the receptacle 922 in second portion 820, into the threaded receptacle 924 in light engine 211, and a head of screw 822 can be wider than the receptacle 922 in second portion 820. In this way, threading screw 926 through receptacle 922 and receptacle 924 may directly couple second portion 820 to light engine 211.

As can be seen in FIG. 9, the head of screw 914 and the head of screw 926 each occupy a certain amount of space. In order to allow the hinge to fully open, it may be desirable to account for the size of the head of screw 914 and the head of screw 926. In the example of FIG. 9, the head of screw 926 is shown as sitting above a surface of second portion 820. In this example, to allow space for the head of screw 926, a recess 918 can be provided in first portion 810, in which the head of screw 926 may fit when first portion 810 and second portion 820 abut against each other. However, in other implementations, second portion 820 may be "countersunk"; that is, a recess may be provided in second portion 820 around receptacle 922, such that the head of screw 926 may sit flush with the surface of second portion 820. A similar discussion is also applicable to screw 914, in that screw 914 may be "counter-sunk" into optical combiner 700, or a recess may be provided in front frame 790 in which the head of screw 914 fits.

Figure 10:
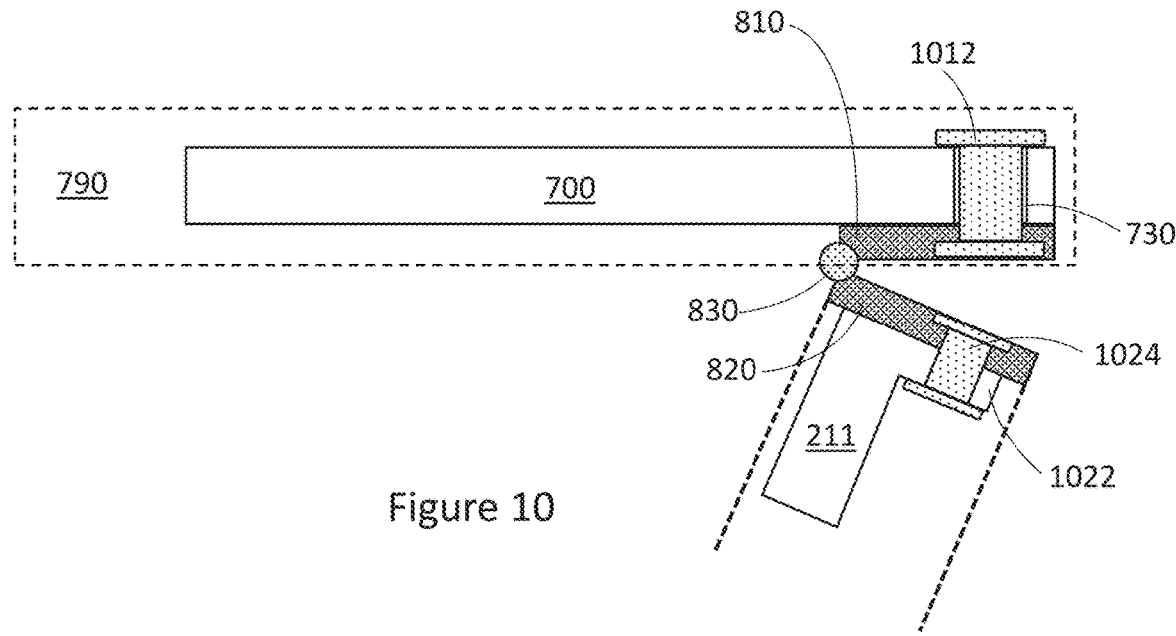
FIG. 10 is a top cutaway view of yet another exemplary hinge structure in accordance with one or more embodiments described herein.

FIG. 10 is a top cutaway view of a hinge similar to the hinge described with reference to FIG. 8. Unless context clearly dictates otherwise, the descriptions of components of FIG. 8 are fully applicable to similarly numbered components in FIG. 10.

In FIG. 10, first portion 810 is directly coupled to an optical combiner 700 by at least one mechanical fastener. Second portion 820 is directly coupled to a light engine 211 by at least one mechanical faster. In particular, first portion 810 and first interface 730 each include a corresponding receptacle, through which a rivet 1012 is inserted. In this way, rivet 1012 can couple first portion 810 to optical combiner 700. Further, light engine 211 can include a mounting bracket 1022, and each of second portion 820 and mounting bracket 1022 can include a corresponding receptacle, through which a rivet 1024 is inserted. In this way, rivet 1024 can directly couple light engine 211 to second portion 820.

FIG. 10 shows a head of rivet 1012 as being counter-sunk into first portion 810, and a head of rivet 1024 as being counter-sunk into second portion 820. However, it is also possible to the respective heads of the rivets to sit above a respect surface of the first portion 810 or the second portion 820. Corresponding recesses may be included in the first portion 810 and the second portion 820 to accommodate the size of such heads.

Figure 11:
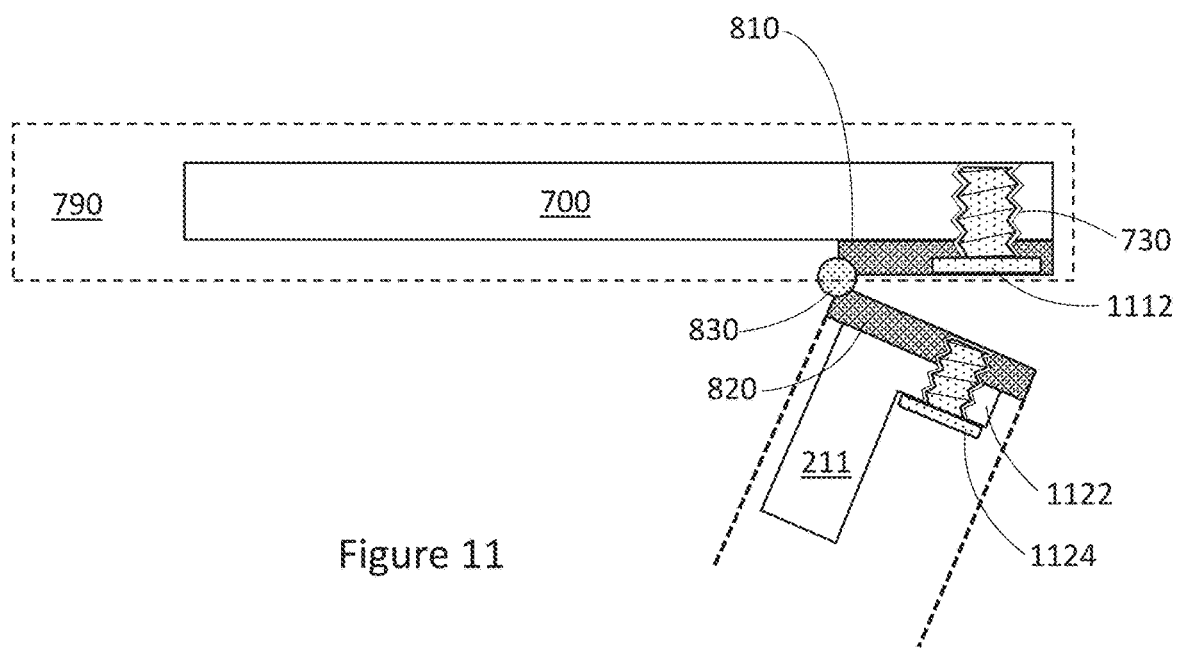
FIG. 11 is a top cutaway view of yet another exemplary hinge structure in accordance with one or more embodiments described herein.

FIG. 11 is a top cutaway view of a hinge similar to the hinge described with reference to FIG. 8. Unless context clearly dictates otherwise, the descriptions of components of FIG. 8 are fully applicable to similarly numbered components in FIG. 11.

In FIG. 11, first portion 810 is directly coupled to an optical combiner 700 by at least one mechanical fastener. Second portion 820 is directly coupled to a light engine 211 by at least one mechanical faster. In particular, first portion 810 and first interface 730 each include a corresponding receptacle, in which a screw 1112 is inserted. In this way, screw 1112 can couple first portion 810 to optical combiner 700. Further, light engine 211 can include a mounting bracket 1122, and each of second portion 820 and mounting bracket 1122 can include a corresponding receptacle, through which a screw 1124 is inserted. In this way, screw 1124 can directly couple light engine 211 to second portion 820.

FIG. 11 illustrates that embodiments in accordance with the present disclosure are not restricted by orientation of fasteners. For example, FIG. 11 shows screw 1124 in an orientation where screw 1124 is put inserted through mounting bracket 1122, then second portion 820. FIG. 11 also shows screw 1112 in an orientation where screw 1112 is first inserted through first portion 810, then optical combiner 700. In contrast, FIG. 9 shows screw 926 in an orientation where screw 926 may be inserted through second portion 820 first, then light engine 211. Further FIG. 9 shows screw 914 in an orientation where screw 914 may be inserted through threaded receptacle 912 and interface 730 at the same time.

In view of the above, Applicant submits that the subject systems, devices, and methods can include any appropriate orientation of fasteners. This is not just limited to screws, but also includes other fastener types as well, such as rivets, pins, protrusions, or clips, for example.

Figure 12:
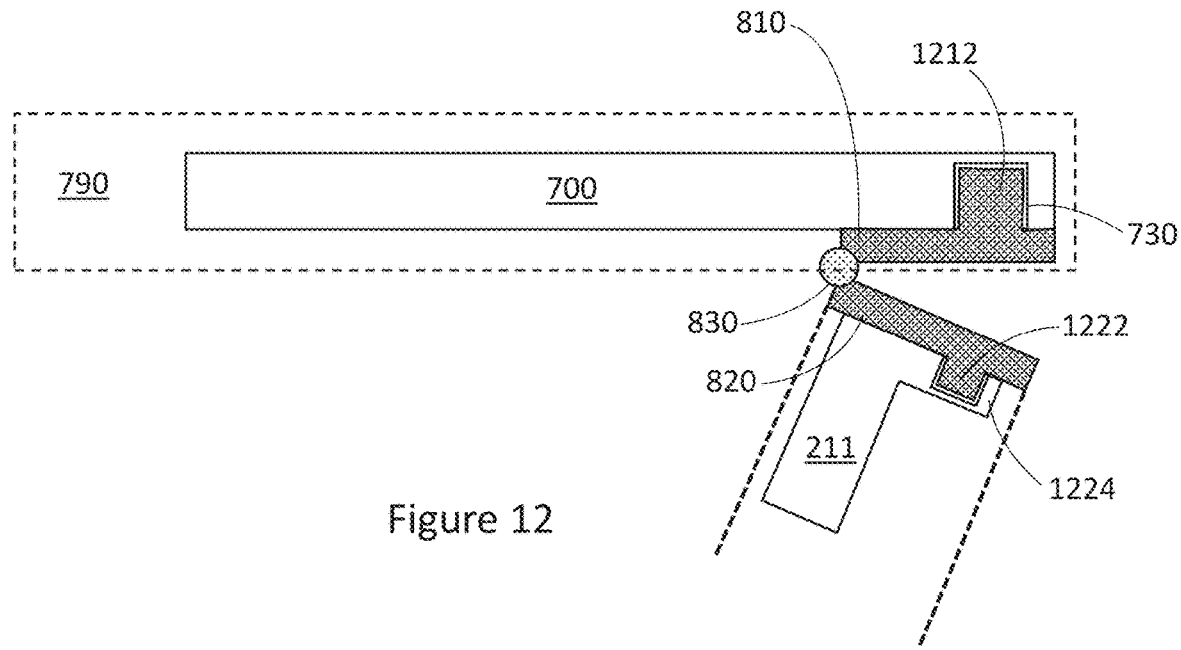
FIG. 12 is a top cutaway view of yet another exemplary hinge structure in accordance with one or more embodiments described herein.

FIG. 12 is a top cutaway view of a hinge similar to the hinge described with reference to FIG. 8. Unless context clearly dictates otherwise, the descriptions of components of FIG. 8 are fully applicable to similarly numbered components in FIG. 12.

In FIG. 12, first portion 810 is directly coupled to an optical combiner 700 by at least one mechanical fastener. Second portion 820 is directly coupled to a light engine 211 by at least one mechanical faster. In particular, first portion 810 includes a protrusion 1212, and first interface 730 includes a corresponding receptacle, in which protrusion 1212 is inserted. Protrusion 1212 can be secured in the receptacle by adhesive, a friction fit, clips, threads, or other appropriate securing features. In this way, optical combiner 700 can be directly coupled to first portion 810 by protrusion 1212. Further, second portion 810 can include a protrusion 1222, and light engine 211 can include a corresponding receptacle, in which protrusion 1222 is inserted. Protrusion 1222 can be secured in the receptacle by adhesive, a friction fit, clips, threads, or other appropriate securing features. In this way, light engine 211 can be directly coupled to second portion 820 by protrusion 1222. Further, in the example shown in FIG. 12, protrusion 1222 is inserted into a corresponding receptacle on a mounting bracket 1224 of light engine 211; it will be appreciated that certain embodiments may utilize alternative configurations. As one non-limiting example, protrusion 1222 may be inserted into a corresponding receptacle in the body of light engine 211 itself.

Figure 13:
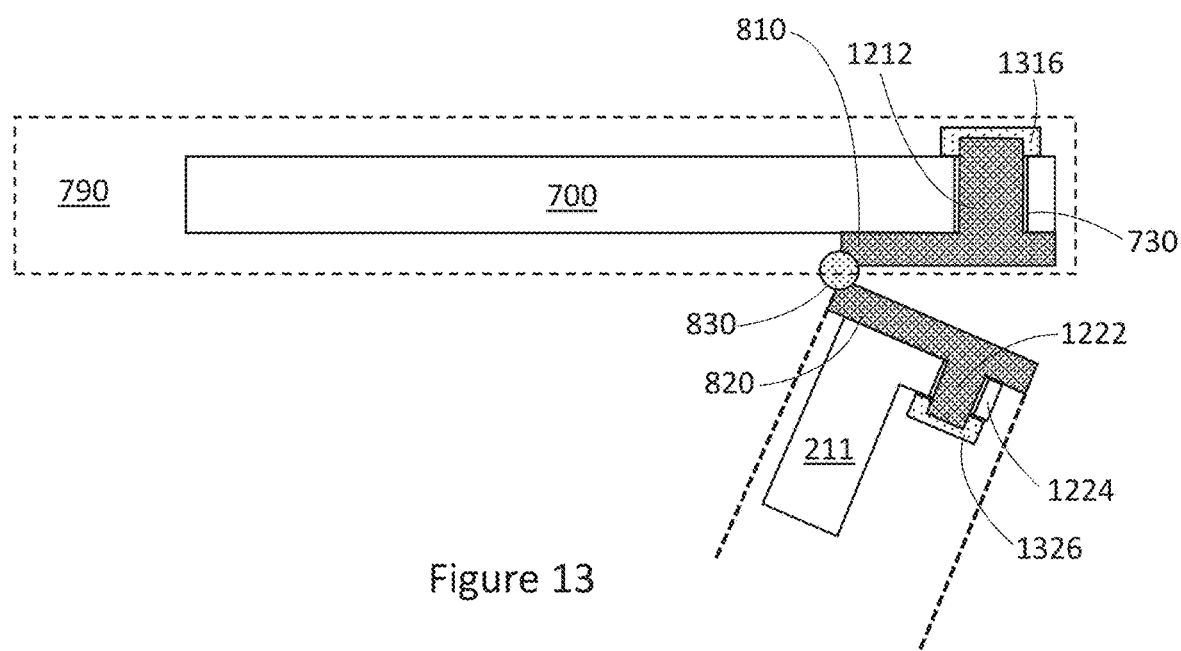
FIG. 13 is a top cutaway view of yet another exemplary hinge structure in accordance with one or more embodiments described herein.

FIG. 13 is a top cutaway view of a hinge similar to the hinge described with reference to FIG. 12. Unless context clearly dictates otherwise, the descriptions of components of FIG. 12 are fully applicable to similarly numbered components in FIG. 13.

FIG. 13 illustrates similar protrusions to those of FIG. 12. However, in FIG. 13, protrusion 1212 extends all the way through optical combiner 700, and is held in place by coupling 1316. Coupling 1316 may be for example adhesive. Coupling 1316 may be a ring or similar shaped receptacle, into which protrusion 1212 can extend and be affixed to. As one example, coupling 1316 may be a ring which fits around protrusion 1212, and is affixed to protrusion 1212 by adhesive. As another example, protrusion 1212 may be threaded, and coupling 1316 may comprise corresponding threads (e.g., coupling 1316 may be a nut), such that coupling 1316 can be threaded onto protrusion 1212 to affix optical combiner 700 to first portion 810.

Similarly, in FIG. 13 protrusion 1222 extends all the way through mounting bracket 1224, to be received by a coupling 1326. Coupling 1326 can be similar to coupling 1316 described above.

Figure 14:
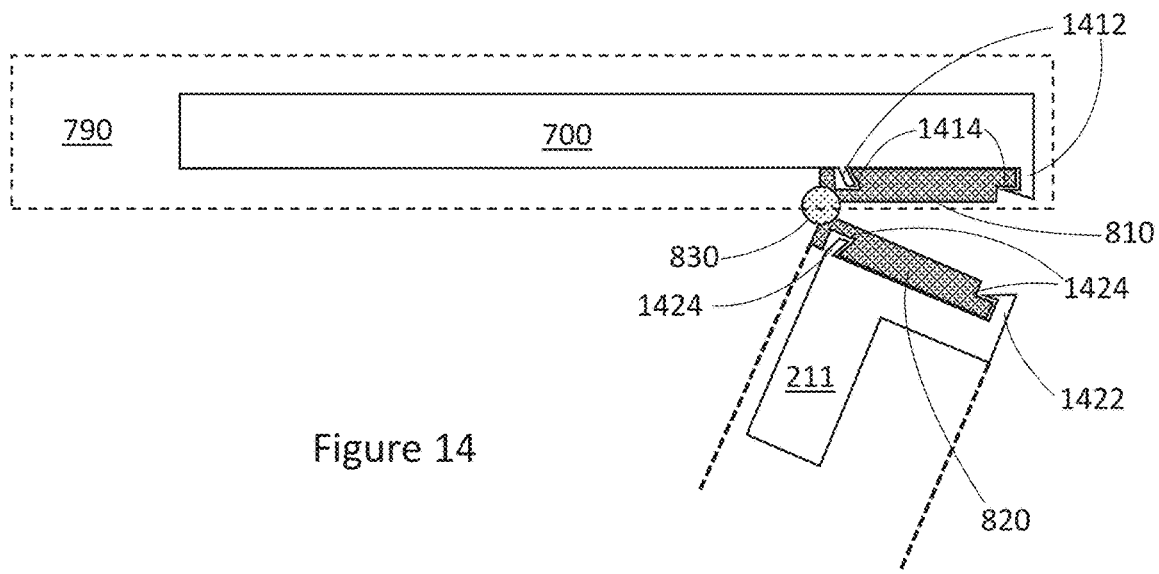
FIG. 14 is a top cutaway view of yet another exemplary hinge structure in accordance with one or more embodiments described herein.

FIG. 14 is a top cutaway view of a hinge similar to the hinge described with reference to FIG. 8. Unless context clearly dictates otherwise, the descriptions of components of FIG. 8 are fully applicable to similarly numbered components in FIG. 14.

In FIG. 14, first portion 810 is directly coupled to an optical combiner 700 by at least one mechanical fastener. Second portion 820 is directly coupled to a light engine 211 by at least one mechanical faster. In particular, first interface 730 of optical combiner 700 can include at least one clip 1412, which can clip to at least one corresponding clip or receptacle 1414 in first portion 810, thereby directly coupling optical combiner 700 to first portion 810. Similarly, light engine 211 can include at least one clip 1422, which can clip to at least one corresponding clip or receptacle 1424 in second portion 820, thereby directly coupling light engine 211 to second portion 820.

Figure 15:
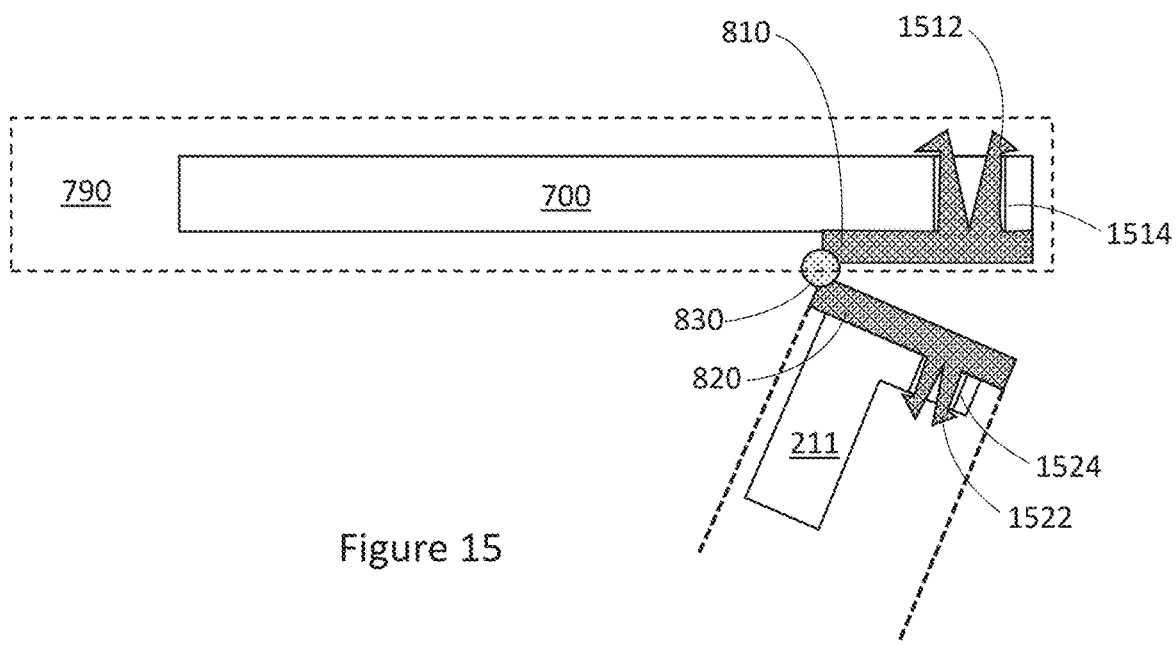
FIG. 15 is a top cutaway view of yet another exemplary hinge structure in accordance with one or more embodiments described herein.

FIG. 15 is a top cutaway view of a hinge similar to the hinge described with reference to FIG. 8. Unless context clearly dictates otherwise, the descriptions of components of FIG. 8 are fully applicable to similarly numbered components in FIG. 15.

In FIG. 15, first portion 810 is directly coupled to an optical combiner 700 by at least one mechanical fastener. Second portion 820 is directly coupled to a light engine 211 by at least one mechanical faster. In particular, first portion 810 can include at least one clip 1512, which can clip to at least one corresponding clip or receptacle 1514 in optical combiner 700, thereby directly coupling optical combiner 700 to first portion 810. Similarly, second portion 820 can include at least one clip 1522, which can clip to at least one corresponding clip or receptacle 1524 in light engine 211, thereby directly coupling light engine 211 to second portion 820.

Figure 16:
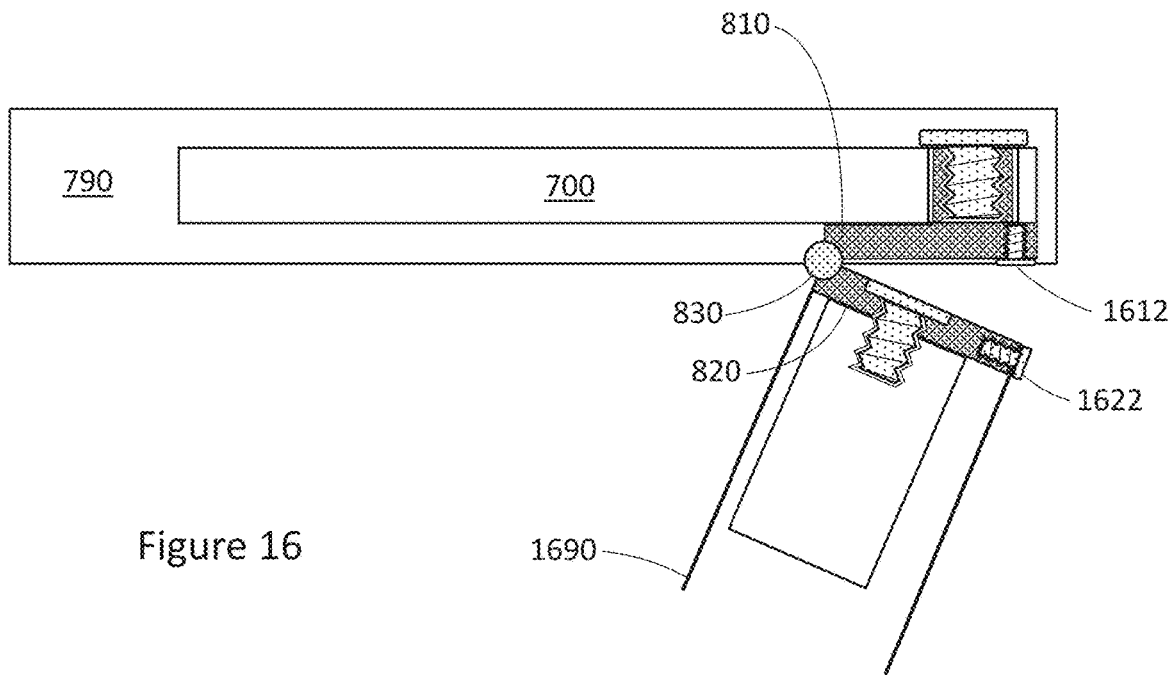
FIG. 16 is a top cutaway view of an exemplary coupling of a front frame and an arm in a WHUD structure in accordance with one or more embodiments described herein.
Figure 17:
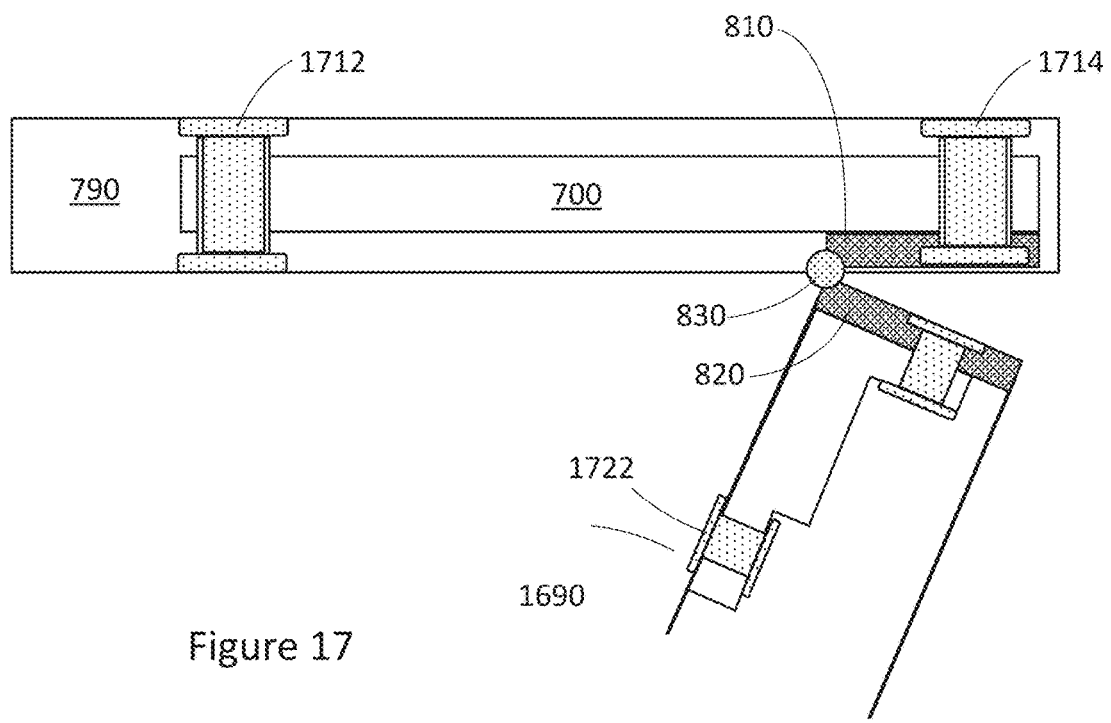
FIG. 17 is a top cutaway view of another exemplary coupling of a front frame and an arm in a WHUD structure in accordance with one or more embodiments described herein.

FIGS. 16 and 17 are top cutaway views of several implementations of coupling a front frame and arm in a WHUD assembly. Each of the implementations shown in FIGS. 16 and 17 illustrate a front frame, an optical combiner, an arm, and a hinge which are to be positioned towards a right side of a user's head in use. However, each of the implementations shown in FIGS. 16 and 17 may also be reversed in orientation to achieve a front frame, an optical combiner, an arm, and a hinge which are to be positioned towards a left side of a user's head in use. Further, the hinge shown in FIGS. 16 and 17 may be similar to any of the hinges described with reference to FIGS. 8-15. Consequently, unless context clearly dictates otherwise, the disclosure related to components of FIGS. 8-15 can be applicable to similarly numbered components in FIGS. 16 and 17. For example, FIG. 16 and FIG. 17 each illustrate a hinge comprising a first portion 810 and a second portion 820. The first portion 810 is coupled to the second portion by a pivot 830, and the first portion 810 can rotate relative to the second portion 820 about pivot 830. First portion 810 is directly coupled to an optical combiner 700 by a first interface 812, and second portion 820 is directly coupled to a light engine 211 by a second interface 822. The means by which first portion 810 is coupled to optical combiner 700, and the means by which second portion 820 is coupled to light engine 211 may be as described with reference to FIGS. 8-15 above.

FIG. 16 illustrates an exemplary implementation for how a front frame 790 and an arm 1690 may be affixed in a WHUD assembly. In FIG. 16, front frame 790 is coupled directly to first portion 810, and arm 1690 is coupled directly to second portion 820. In particular, each of front frame 790 and first portion 810 may include a respective receptacle, through which a screw 1612 is inserted. In this way, screw 1612 can directly couple front frame 790 to first portion 810. Additional stability may be achieved by directly coupling first portion 810 to both optical combiner 700 and front frame 790. However, certain embodiments may utilize alternative configurations in which optical combiner 700 and front frame 790 are not directly coupled. Further, each of arm 1690 and second portion 820 may include a respective receptacle, through which a screw 1622 is inserted. In this way, screw 1622 can directly couple arm 1690 to second portion 820. Similarly, additional stability may be achieved by directly coupling second portion 820 to both light engine 211 and arm 1690. However, certain embodiments may utilize alternative configurations in which light engine 211 and arm 1690 are not directly coupled.

FIG. 17 illustrates another exemplary implementation for how a front frame 790 and an arm 1690 may be affixed in a WHUD assembly. In FIG. 17, front frame 790 is coupled directly to optical combiner 700, and arm 1690 is coupled directly to light engine 211. In particular, each of front frame 790 and optical combiner 700 may include a respective receptacle, through which a rivet 1712 is inserted. In this way, rivet 1712 can directly couple front frame 790 to optical combiner 700. Consequently, front frame 790 is indirectly coupled to first portion 810 by optical combiner 700. Further, each of arm 1690 and light engine 211 may include a respective receptacle, through which a rivet 1722 is inserted. In this way, rivet 1722 can directly couple arm 1690 to light engine 211. Consequently, arm 1790 is indirectly coupled to second portion 820 by light engine 211.

FIG. 17 also illustrates a rivet 1714, which can extend through a respective receptacle in each of front frame 790, optical combiner 700, and first portion 810. This will couple each of front frame 790, optical combiner 700, and first portion 810 together. Similarly, a fastening mechanism may be included which couples each of second portion 820, light engine 211, and arm 1690 together. However, inclusion of features like rivet 1714 is optional, such that front frame 790 may only be coupled to first portion 810 indirectly via optical combiner 700. Similarly, arm 1690 may only be coupled to second portion 820 indirectly via light engine 211.

Although the embodiment of FIG. 16 utilizes screws, and the embodiment of FIG. 17 utilizes rivets, it will be appreciated that in various embodiments front frame 790 and arm 1690 may be coupled in a WHUD assembly by any appropriate fastener, including any of the mechanical fasteners or fastening mechanisms discussed above regarding FIGS. 8-15, such as at least one protrusion, pin, clip, mounting bracket, adhesive, or any other appropriate mechanism. Further, the means for coupling front frame 790 and arm 1690 in a WHUD assembly as shown in FIG. 16 and FIG. 17 may be implemented in combination with any of the means for coupling optical combiner 700 to first portion 810 and the means for coupling light engine 211 to second portion 820 as described with reference to FIGS. 8-15.

FIGS. 8-17 above illustrate various exemplary embodiments in which components are coupled in a WHUD assembly. One skilled in the art will appreciate that or more of the discussed embodiments may be used in combination, and/or that a plurality of the disclosed coupling means may be implemented in one or more individual embodiments. As one non-limiting example, instead of a single mechanical fastener coupling optical combiner 700 to first portion 810, such as screw 914 in FIG. 9, a plurality of mechanical fasteners may be used, such as a plurality of screws similar to screw 914 in FIG. 9. Similarly, instead of a single mechanical fastener coupling light engine 211 to second portion 820, such as screw 926 in FIG. 9, a plurality of mechanical fasteners may be used, such as a plurality of screws similar to screw 926 in FIG. 9. Further, multiple different fastening mechanisms may be used in a given embodiment. As another non-limiting example, a screw (such as screw 914 in FIG. 9) as well as a protrusion (such as protrusion 1212 in FIG. 12) may be used together to couple optical combiner 700 to first portion 810. Similarly, a screw such as screw 926 in FIG. 9, as well as a protrusion such as protrusion 1222 in FIG. 12 may be used together to couple light engine 211 to second portion 820. In various embodiments, any appropriate quantity or combination of fastening mechanisms, such as those described with reference to FIGS. 8-17 or otherwise, may be utilized.

When operating a WHUD, the rotational position of the hinge may also affect the display quality. As an example, even when a stable positioning between the optical combiner, the hinge, and the light engine are achieved, the hinge itself still rotates. Thus, if the WHUD is in use, but the hinge is not open within a suitable angular range, the display may be reduced in quality, may be shifted in position as seen by a viewer, or may not be visible at all. To address this issue, it is desirable to provide a hinge which can, in use, maintain a desired opening angle. FIGS. 18A-18G, 19A, 19B, and 20-27 accordingly illustrate several exemplary embodiments that include such hinges, as discussed below.

Figure 18A:
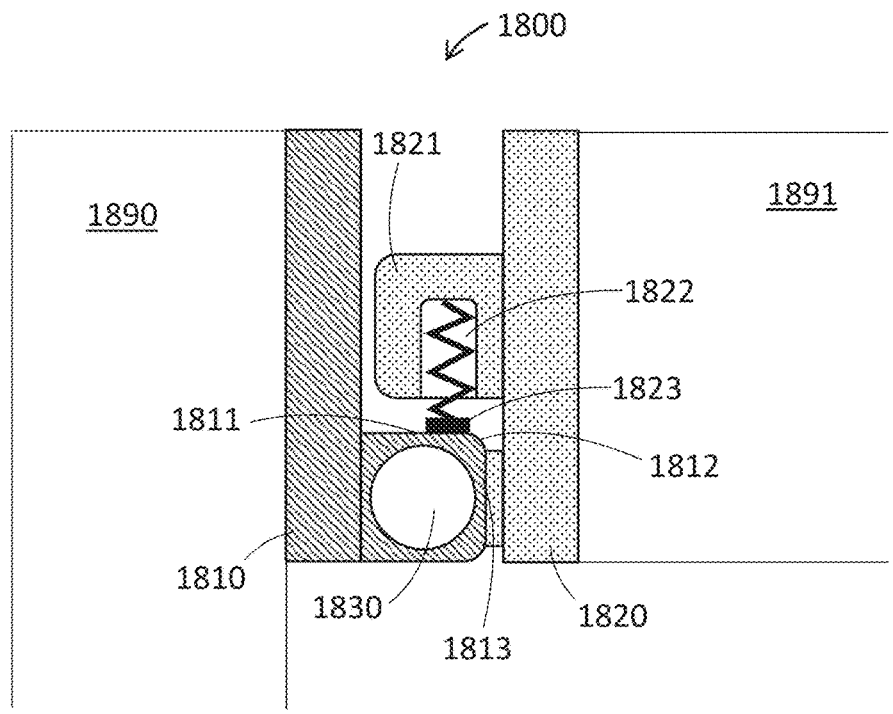
FIGS. 18A, 18B, and 18C are top cutaway views of an exemplary hinge bias structure in accordance with one or more embodiments described herein.
Figure 18B:
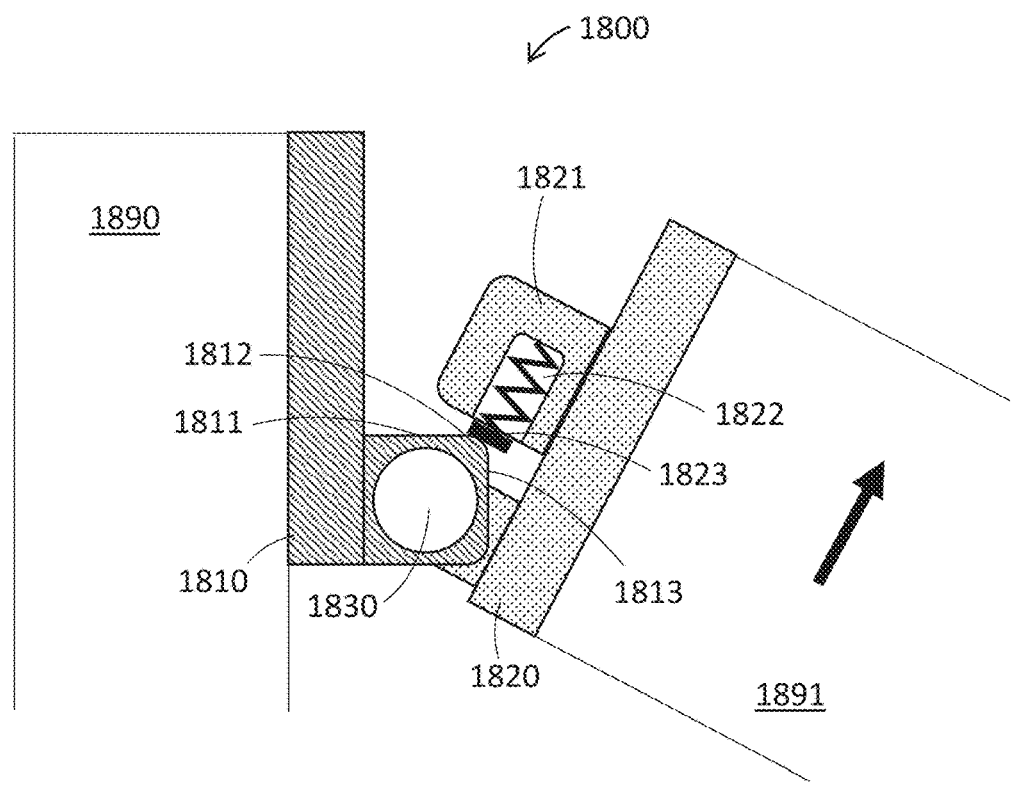
Figure 18C:
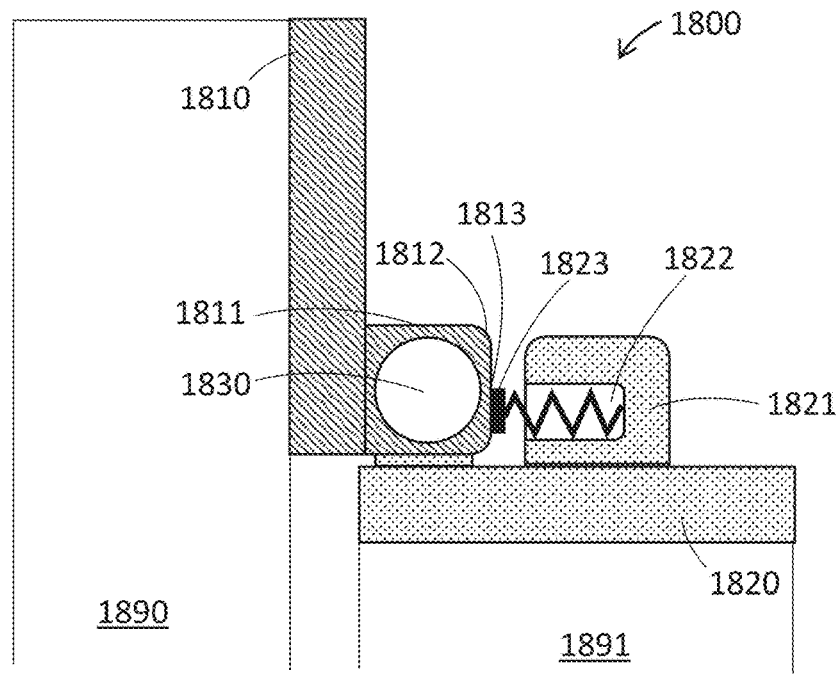

FIGS. 18A-18C are top cutaway views which show a hinge 1800 which includes a bias element to hold the hinge in a maximum opening position, while still allowing the hinge to be folded and remain closed when desired. FIG. 18A shows hinge 1800 in an unfolded configuration, FIG. 18B shows hinge 1800 transitioning between the unfolded configuration and a closed configuration, and FIG. 18C shows hinge 1800 in the closed configuration. In the below discussion of hinges, "unfolded configuration", "folded configuration", and "partial-folded configuration" refer to the state of the hinge based on the state of a WHUD in which the hinge is implemented. For example, a hinge is in an "unfolded configuration" when the WHUD is in an unfolded configuration, such as that shown in FIG. 2A. Similarly, a hinge is in a "folded configuration" when the WHUD is in a folded configuration, such as that shown in FIG. 2C. Similarly, a hinge is in a "partial-folded configuration" between the folded configuration and the unfolded configuration when the WHUD is in a partial-folded configuration, such as shown in FIG. 2B.

In FIGS. 18A-18C, hinge 1800 includes a first portion 1810 and a second portion 1820. First portion 1810 is coupled to second portion 1820 by a pivot 1830. First portion 1810 and second portion 1820 can rotate relative to each other about pivot 1830. First portion 1810 is coupled to a front portion 1890 of a WHUD, either directly or indirectly, for example as discussed above regarding FIGS. 16 and 17. Further, first portion 1810 can be coupled directly to an optical combiner as discussed above with reference to FIGS. 8-15. Second portion 1820 is coupled to an arm 1891 of a WHUD, either directly or indirectly, for example as discussed above regarding FIGS. 16 and 17. Further, second portion 1820 can be coupled directly to a light engine, for example as discussed above regarding FIGS. 8-15.

In the example of FIGS. 18A-18C, first portion 1810 includes a first stop 1811, a cam 1812, and a second stop 1813. First stop 1811, cam 1812, and second stop 1813 may be adjacent surfaces, as shown in FIG. 18A-18C, or may be discrete components, such as separate protrusions or pins. Second portion 1820 can carry a bias element 1823. In the case of FIGS. 18A-18C, bias element 1823 comprises a spring carried partially in a cavity 1822 of a protrusion 1821. However, alternative implementations of bias element may be utilized, as discussed below with reference to FIGS. 22-25.

In the unfolded configuration shown in FIG. 18A, bias element 1823 projects from cavity 1822 to contact first stop 1811. Bias element 1823 pushes against first stop 1811, causing arm 1891 to rotate outwards. As a result, bias element 1823 applies a force which biases hinge 1800 towards the unfolded configuration, which causes the opening angle of hinge 1800 to be more consistent in use than a hinge which does not include such a bias element. When transitioning between the unfolded configuration and the folded configuration, bias element 1823 slides to contact cam 1812, which is radially more distant from pivot 1830 than first stop 1811 and second stop 1813. As a result, bias element 1823 may apply more force when sliding towards cam 1812, thereby at least partially inhibiting movement across cam 1812. This biases hinge 1800 to stay in either the unfolded configuration or the folded configuration, such that application of external force is needed to transition between the folded configuration and the unfolded configuration. The principles of operation of bias element 1823, first stop 1811, cam 1812, and second stop 1813 are described in more detail below with reference to FIGS. 18D-18G.

Figure 18D:
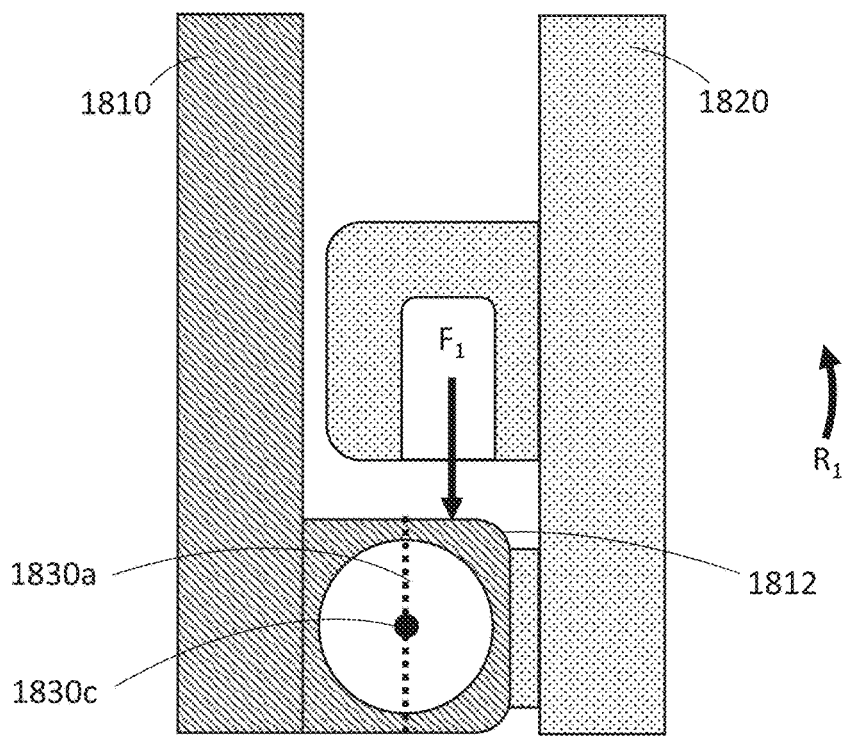
FIGS. 18D, 18E, 18F, and 18G are partial top cutaway views which illustrate operating principles of hinge bias structures in accordance with one or more embodiments described herein.

FIG. 18D is a top cutaway partial view of hinge 1800 in the unfolded configuration. FIG. 18D is zoomed-in compared to FIG. 18A, and several components of FIG. 18D are not labelled to reduce clutter. However, the components of hinge 1800 shown in FIG. 18D can be the same as those shown in FIG. 18A. Further, instead of showing bias element 1823 as a spring, FIG. 18D shows an arrow conceptually representing a force $F_1$ applied by bias element 1823. This force $F_1$ can be applied by a bias element such as the spring shown in FIG. 18A, or any other appropriate bias element such as those described with reference to FIGS. 22-25 below.

Axis 1830a shown in FIG. 18D is an axis which runs through a center of rotation 1830c of pivot 1830, and runs parallel to the direction of force $F_1$ (e.g., parallel to the direction of projection of the spring bias element 1823 shown in FIG. 18A). As long as force $F_1$ is spatially offset from axis 1830a, force $F_1$ will result in a rotational bias being applied to second portion 1820 of hinge 1800. In the example shown in FIG. 18D, force $F_1$ is applied spatially between axis 1830a and cam 1812, which results in an outward rotational bias $R_1$ being applied to second portion 1820 and thus to arm 1891. This rotational bias $R_1$ will cause second portion 1820 to move towards the unfolded configuration of hinge 1800 if hinge 1800 is not already in the unfolded configuration. If hinge 1800 is already in the unfolded configuration, the rotational bias $R_1$ will remain as a force which resists movement of second portion 1820 away from the unfolded configuration. That is, rotational bias $R_1$ may act to stabilize hinge 1800 in the unfolded configuration, and thus may act to stabilize the relative positioning of a light engine in arm 1891 and an optical combiner in front frame 1890.

Figure 18E:
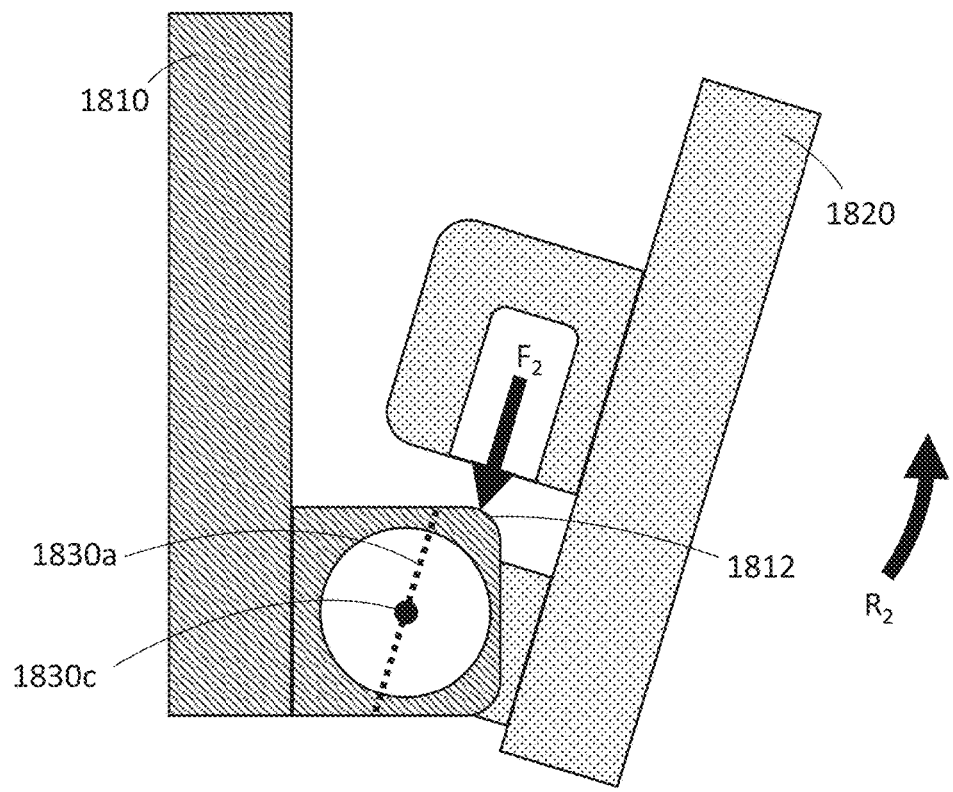
Figure 18F:
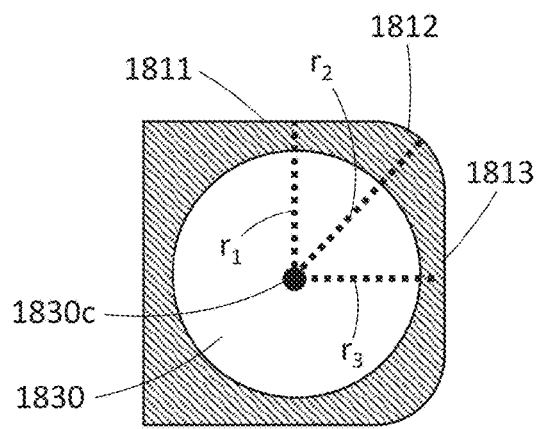
Figure 18G:
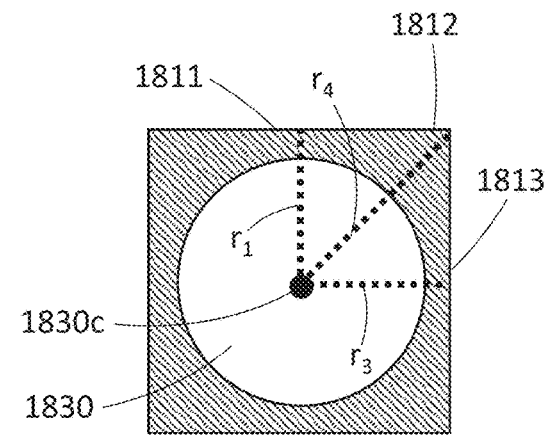

However, it is desirable for a WHUD to not only be stabilized in an unfolded configuration, but also to be able to transition to a folded configuration for greater portability when not in use. To this end, it may be advantageous if force $F_1$ alone does not cause hinge 1800 to transition all the way from the folded configuration to the unfolded configuration. To this end, the example of FIGS. 18A-18G includes a cam 1812 which serves to bias second portion 1820 towards the unfolded configuration over a first range of the opening angle of hinge 1800, and which also serves to bias second portion 1820 towards the folded configuration over a second range of the opening angle of hinge 1800. FIGS. 18E, 18F, and 18G illustrate how the cam 1812 interacts with bias element 1823 to achieve these features.

FIG. 18E is a top cutaway partial view of hinge 1800 in a partial-folded configuration, i.e. partway between the unfolded configuration and the folded configuration. FIG. 18E is zoomed-in compared to FIG. 18B, and several components of FIG. 18E are not labelled to reduce clutter. However, the components of hinge 1800 shown in FIG. 18E can be the same as those shown in FIG. 18B. Further, instead of showing bias element 1823 as a spring, FIG. 18E shows an arrow conceptually showing a force $F_2$ applied by bias element 1823. This force $F_2$ may in certain embodiments be applied by a bias element such as the spring shown in FIG. 18A, or any other appropriate bias element such as those described with reference to exemplary embodiments depicted in FIGS. 22-25 below.

FIG. 18E shows force $F_2$ applied against cam 1812, instead of force $F_1$ applied against stop 1811 as shown in FIG. 18D. Further, cam 1812 can be radially further from center of rotation 1830c compared to first stop 1811. As a result, when bias element 1823 is in contact with cam 1812, bias element 1823 will be more compressed, and thus will apply a greater force, as compared to when bias element 1823 is in contact with stop 1811. For this reason, force $F_2$ is greater than force $F_1$, and consequently a rotational bias $R_2$ caused by force $F_2$ is greater than rotational bias $R_1$ caused by force $F_1$. In effect, the further second portion 1820 is from the unfolded configuration, the greater the rotational bias which biases the hinge to be in the unfolded configuration. This acts to resists movement of the hinge from the unfolded configuration to the folded configuration.

However, once the hinge rotates past a peak of the cam 1812, the force applied by bias element 1823 will reduce, thus allowing second portion 1820 to continue rotation until hinge 1800 is in the folded configuration shown in FIG. 18C. The peak of the cam 1812 can be considered as a point of the cam 1812 which is the greatest radial distance from center of rotation 1830c. Once bias element 1823 is past this peak, bias element 1823 will be less compressed, and will thus apply less force, enabling easier rotation of hinge 1800.

FIG. 18F illustrates a top view of an exemplary region of first portion 1810 as included in hinge 1800 discussed above. FIG. 18F illustrates pivot 1830 comprising a center of rotation 1830c. FIG. 18F further illustrates first stop 1811, cam 1812, and second stop 1813. FIG. 18F illustrates three exemplary radii: $r_1$ which is the radial distance between center of rotation 1830c and the closest point of first stop 1811, $r_2$ which is the radial distance between center of rotation 1830c and the peak of cam 1812, and $r_3$ which is the radial distance between center of rotation 1830c and to the closest point of second stop 1813. As can be seen from FIG. 18F, $r_3$ is greater than both $r_1$ and $r_2$. As a result, as bias element 1823 moves from first stop 1811 towards cam 1812 (i.e., as hinge 1800 moves from the unfolded configuration towards the folded configuration), the force applied by bias element 1823 will increase, thus inhibiting transition from the unfolded configuration to the folded configuration. Similarly, as bias element 1823 moves from second stop 1813 towards cam 1812 (i.e., as hinge 1800 moves from the folded configuration towards the unfolded configuration), the force applied by bias element 1823 will increase, thus inhibiting transition from the folded configuration to the unfolded configuration.

In view of the above, significant external force may be required to transition the hinge 1800 from the unfolded configuration to the folded configuration, and to transition the hinge 1800 from the folded configuration to the unfolded configuration. Such significant external force may include a deliberate effort by the user to fold a WHUD in which the hinge 1800 is included. However, a bump or jostling of the WHUD may be insufficient to transition the hinge 1800 between the unfolded configuration and the folded configuration. Consequently, the cam 1812 and bias element 1823 may provide sufficient resistance to prevent undesired transition between the unfolded configuration and the folded configuration, but such transition may still be possible by deliberate application of effort by the user. In addition to the hinge 1800 being more stable in both the unfolded configuration and the folded configuration, the above described features also give the hinge a stronger, more rigid feel, which in turn makes a WHUD which utilizes such a hinge feel more premium and high quality.

FIG. 18G illustrates a top view of an exemplary region of first portion 1810 similar to as discussed with reference to FIG. 18F. As such, unless context clearly dictates otherwise, the discussion of FIG. 18F can be applicable to FIG. 18G. One difference between FIG. 18G and FIG. 18F is that in FIG. 18G, the peak of cam 1812 is illustrated as a sharp point, instead of a curve. Expressed differently, the radial distance $r_4$ between center of rotation 1830c and the peak of cam 1812 in FIG. 18G is greater than the radial distance $r_2$ in FIG. 18F. This can have the effect that when bias element 1823 approaches the peak of cam 1812 (from either the folded or unfolded configuration), bias element 1823 will be compressed even more than in the implementation discussed in FIG. 18F. As a result, the implementation illustrated in FIG. 18G will provide greater resistance in the transition between the folded configuration and the unfolded configuration. That is, the sharper the cam 1812, the more resistance will be provided against a transition between the folded configuration and the unfolded configuration.

Figure 19A:
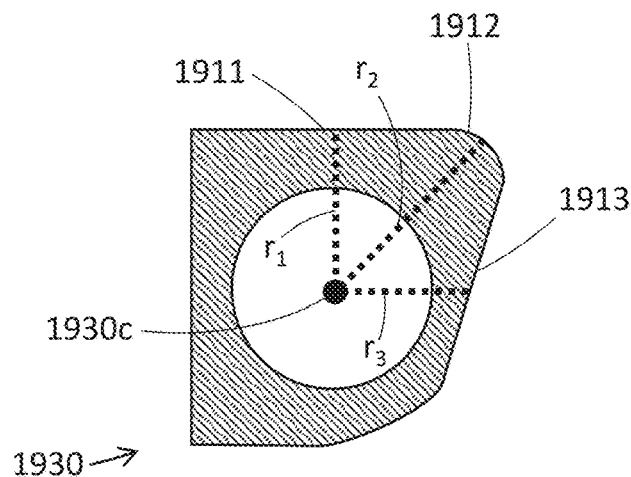
FIGS. 19A and 19B are top cutaway views of another exemplary hinge bias structure in accordance with one or more embodiments described herein.
Figure 19B:
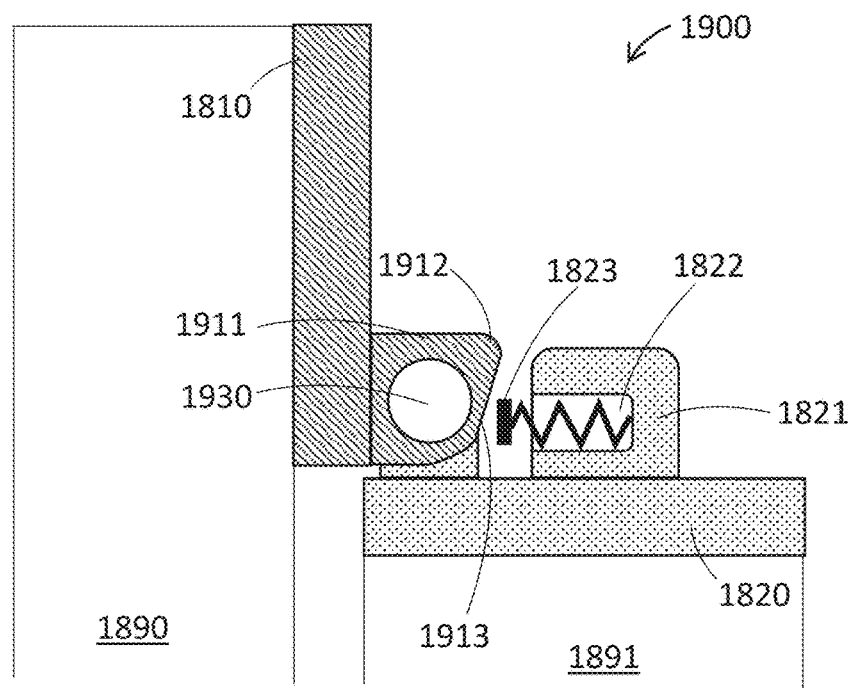

In both of the implementations shown in FIGS. 18F and 18G, $r_1$ and $r_3$ can be equal, $r_1$ can be greater than $r_3$, or $r_3$ can be greater than $r_1$. However, it may be preferable for $r_1$ to be greater than $r_3$. This is because despite cam 1812 providing resistance against the transition from the folded configuration to the unfolded configuration, if bias element 1823 pushes against second stop 1813 in the folded configuration, bias element 1823 can exert some amount of force which results in a rotational bias which causes second portion 1820 to rotate outwards. While this rotational bias may not be sufficient to cause the hinge to transition to the unfolded configuration, the force may still cause second portion 1820 to not remain completely in the folded configuration. By making $r_3$ smaller, the amount of outward rotational bias applied in the folded configuration can be reduced or eliminated. FIGS. 19A and 19B illustrate this concept in detail.

FIG. 19A is a top view of a pivot 1930 which may be implemented in a hinge 1900 as shown in FIG. 19B. Pivot 1930 and hinge 1900 can be similar in at least some respects to pivot 1830 and hinge 1800 discussed above. As such, unless context clearly dictates otherwise, the discussion of features of pivot 1830 and hinge 1800 above can be fully applicable to similarly numbered features in FIGS. 19A and 19B.

Pivot 1930 includes a first stop 1911 which can be similar to first stop 1811 discussed above. Pivot 1930 also includes a cam 1912 which can be similar to cam 1812 discussed above. Pivot 1930 also includes a second stop 1913. Second stop 1913 can be somewhat similar to second stop 1813 discussed above, but second stop 1913 can differ in relative positioning and orientation with respect to first stop 1911 and cam 1912. For example, radial distance $r_3$ from a center of rotation 1930c of pivot 1930 to second stop 1913 can be smaller than radial distance $r_1$ from center of rotation 1930c to first stop 1911. In the example, this is achieved by having first stop 1911 and second stop 1913 being at an angle of less than 90 degrees relative to each other, such that second stop 1913 has a slope as shown in FIG. 19A. Similar effects may be achieved by other implementations of second stop 1913, such as for example second stop 1913 being curved.

A consequence of $r_3$ being smaller than $r_1$ is that a bias element 1823 will be compressed less when hinge 1900 is in the folded configuration compared to when hinge 1900 is in the unfolded configuration. Consequently, bias element 1823 will apply less force against second stop 1913 in the folded configuration, and thus there will be less outward rotational bias applied to hinge 1900 when in the folded configuration. If second stop 1913 is appropriately structured, it is possible to significantly decrease outward rotational bias applied when the hinge 1900 is in the folded configuration. For example, the angle between second stop 1913 and first stop 1911 may be sufficiently small, i.e. second stop may be at a steep enough slope, such that in the folded configuration bias element 1823 does not contact second stop 1913 at all as illustrated in FIG. 19B, or contacts second stop 1913 so gently that no significant force is applied.

However, in some embodiments, it may be preferable to only minimize force applied by bias element 1823 against second stop 1913, instead of striving to achieve zero applied force. For example, achieving zero applied force may require having second stop 1913 be so steep that pivot 1930 becomes very thin and weak. In such a case, it can be desirable to strike a balance between force applied by bias element 1823 in the folded configuration and hinge strength.

Figure 20:
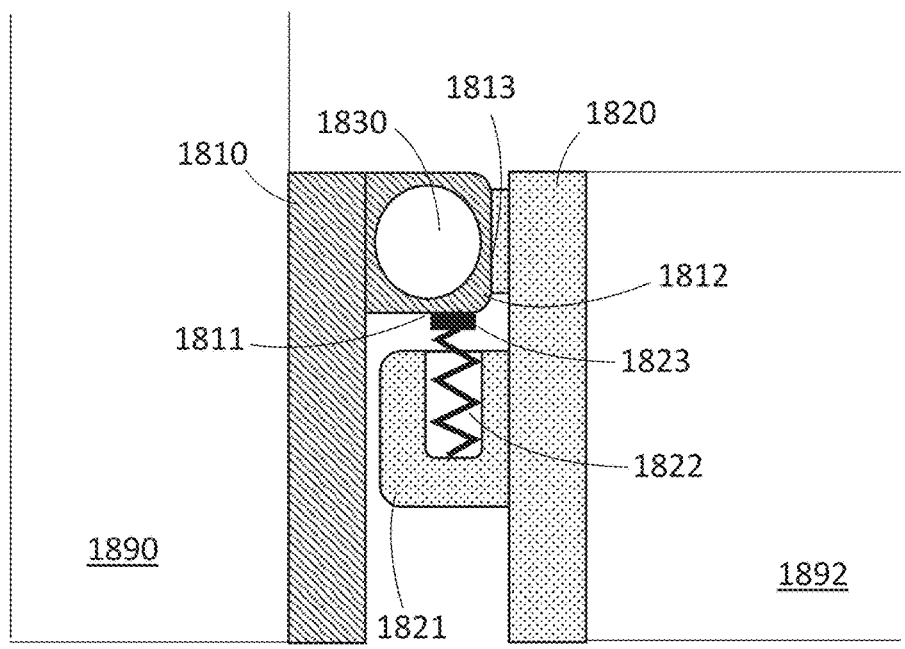
FIG. 20 is a top cutaway view of yet another exemplary hinge bias structure in accordance with one or more embodiments described herein.

FIG. 20 is a top cutaway view of a hinge 2000 which can be similar to hinge 1800 and hinge 1900 discussed with reference to FIGS. 18A-18G and 19A-19B. The discussion above of features of hinges 1800 and 1900 can be applicable to similarly numbered features in FIG. 20. On difference between hinge 2000 in FIG. 20 and hinges 1800 and 1900 is that the orientation of hinge 2000 is reversed. In particular, hinges 1800 and 1900 are hinges which couple a right arm 1891 of a WHUD to a front frame 1890. Hinge 2000 on the other hand couples a left arm 1892 of a WHUD to front frame 1890. Left arm 1892 may contain a light engine, such that the WHUD may be a monocular display visible to a user's left eye. In some implementations, arm 1891 and arm 1892 may each contain a respective display, such that the WHUD is a binocular display. Further, Even if a WHUD comprises a monocular display generated by a single light engine in only one of arm 1891 or arm 1892, both of arm 1891 and arm 1892 may comprises a hinge such as hinge 1800, hinge 1900, or hinge 2000. This will give the WHUD a balanced feel.

Figure 21:
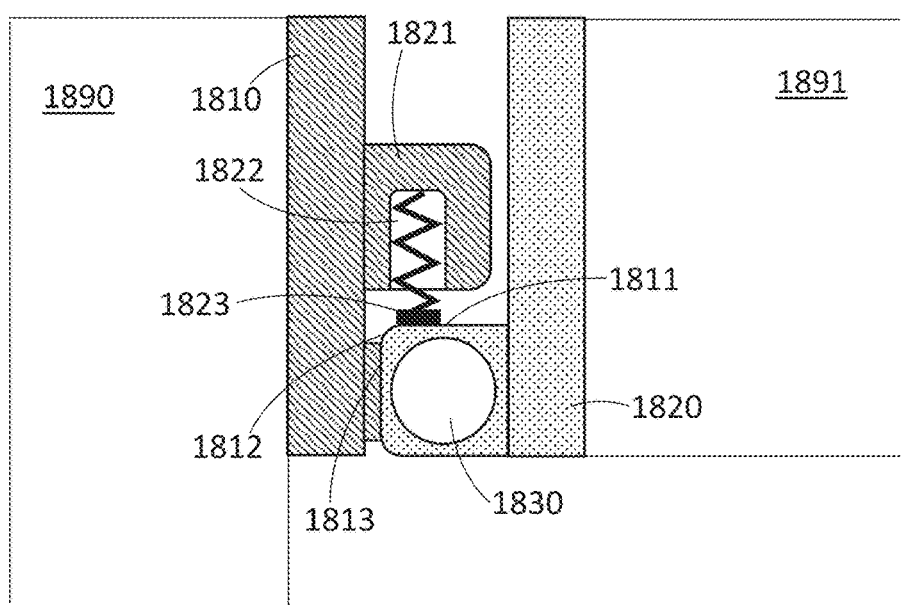
FIG. 21 is a top cutaway view of yet another exemplary hinge bias structure in accordance with one or more embodiments described herein.

FIG. 21 is a top cutaway view of a hinge 2100 which in some respects may be similar to hinge 1800, hinge 1900, and hinge 2000 discussed with reference to FIGS. 18A-18G, 19A-19B, and 20. The discussion above of features of hinge 1800, hinge 1900, and hinge 2000 can be applicable to similarly numbered features in FIG. 21. One difference between hinge 2100 in FIG. 21 and hinge 1800, hinge 1900, and hinge 2000 is that positioning of components of hinge 2100 is reversed. In particular, in hinge 2100, bias element 1823 is carried by first portion 1810, whereas first stop 1811, cam 1812, and second stop 1813 are carried by second portion 1820.

FIGS. 22-25 illustrate several exemplary implementations of bias elements that may be utilized in accordance with the present disclosure. Unless context clearly dictates otherwise, the discussion above regarding hinges 1800, 1900, 2000, and 2100 in FIGS. 18A-G, 19A, 19B, 20, and 21 may be applicable to various embodiments, including those shown in FIGS. 22-25. As such, the discussion of features related to hinges 1800, 1900, 2000, and 2100 above may be applied to similarly numbered features shown in FIGS. 22-25.

Figure 22:
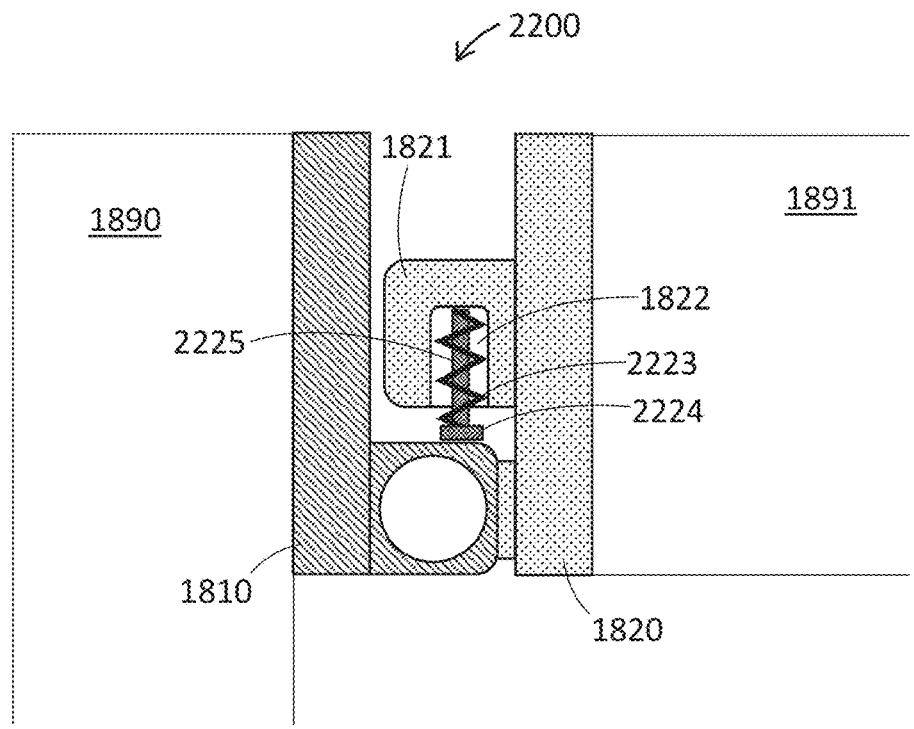
FIG. 22 is a top cutaway view of yet another exemplary hinge bias structure in accordance with one or more embodiments described herein.

FIG. 22 is a top cutaway view of a hinge 2200, in which a bias element can be partially positioned within cavity 1822. Said bias element can include a spring 2223 which actuates a piston 2224 on a shaft 2225.

Figure 23:
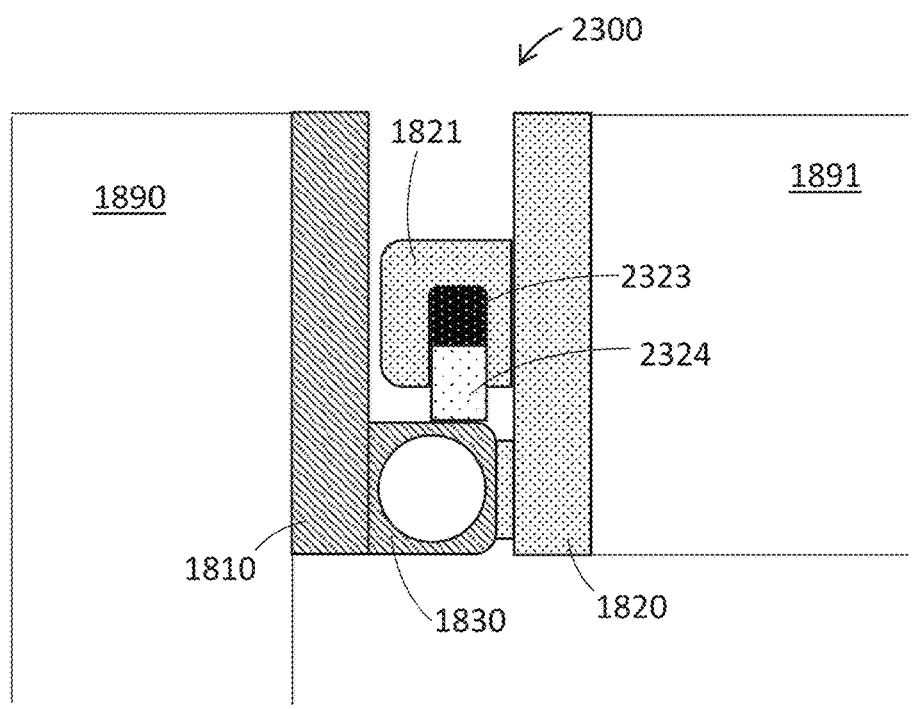
FIG. 23 is a top cutaway view of yet another exemplary hinge bias structure in accordance with one or more embodiments described herein.

FIG. 23 is a top cutaway view of a hinge 2300, in which a bias element can be partially positioned within a cavity of second portion 1820. Said bias element can include a compressible substance 2323 which actuates a piston 2324. Compressible substance 2323 may include for example a fluid such as a liquid or gas, or a solid such as rubber or foam. When compressed, compressible substance 2323 can exert elastic force to expand to its original volume.

Figure 24:
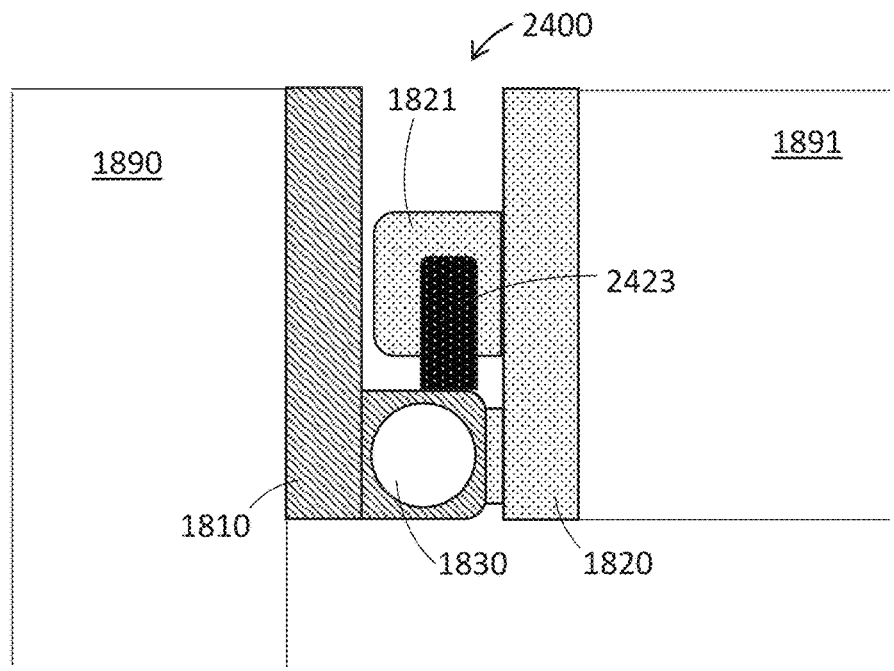
FIG. 24 is a top cutaway view of yet another exemplary hinge bias structure in accordance with one or more embodiments described herein.

FIG. 24 is a top cutaway view of a hinge 2400, in which a bias element can be partially positioned within a cavity of second portion 1820, said bias element including a compressible substance 2423 which projects from the cavity. Compressible substance 2423 may include for example a solid such as rubber or foam. When compressed, compressible substance 2423 can exert elastic force to expand to its original volume. In contrast to compressible substance 2323 of FIG. 23, compressible substance 2424 itself can contact surfaces of pivot 1830, such that an intermediate component such as a piston is not required.

Figure 25:
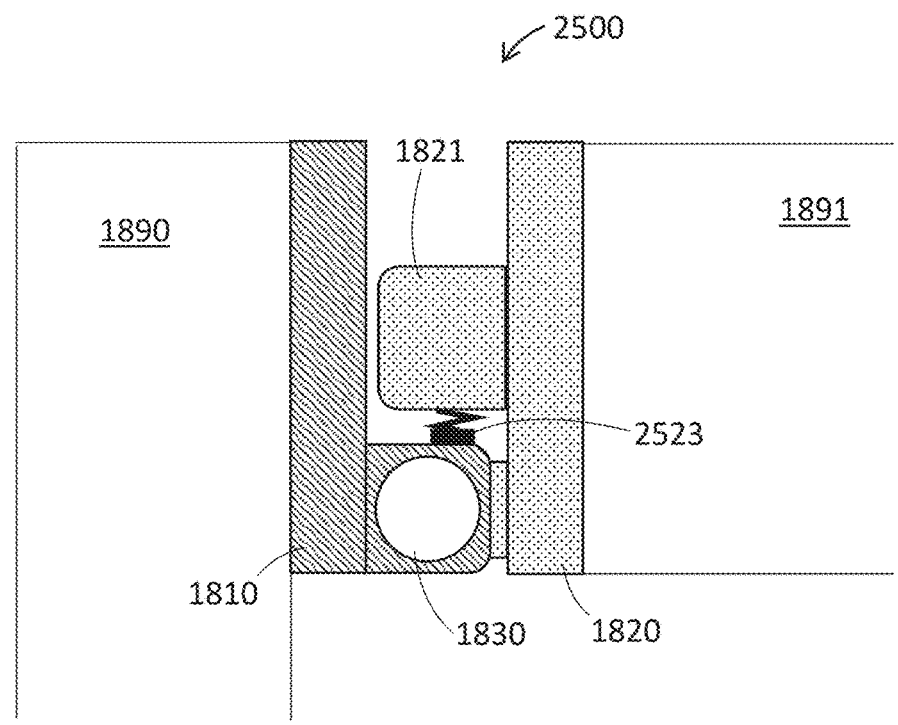
FIG. 25 is a top cutaway view of yet another exemplary hinge bias structure in accordance with one or more embodiments described herein.

FIG. 25 is a top cutaway view of a hinge 2500. A bias element 2523 can be mounted on a surface of second portion 1820, such that no cavity is required therein. Bias element 2523 can for example include a spring, piston, compressible substance, or any other appropriate bias element.

Figure 26:
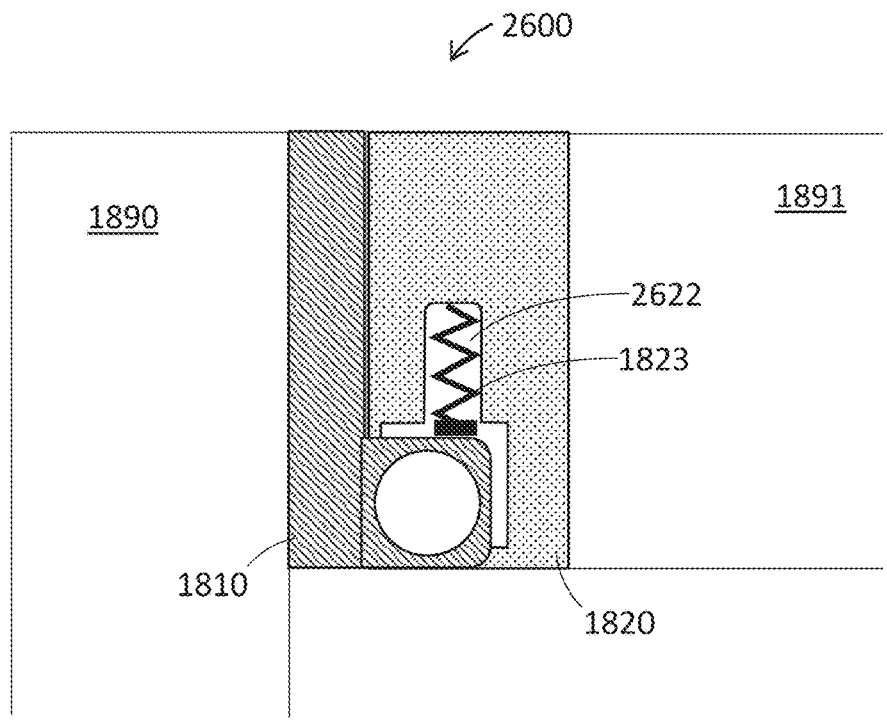
FIG. 26 is a top cutaway view of yet another exemplary hinge bias structure in accordance with one or more embodiments described herein.

Although various embodiments discussed herein show a bias element carried by a protrusion 1821 of second portion 1820; it will be appreciated that one or more embodiments may utilize alternative configurations that do not include said protrusion. For example, FIG. 26 is a top cutaway view which illustrates a hinge 2600. Unless context clearly dictates otherwise, the discussion above regarding hinges 1800, 1900, 2000, 2100, 2200, 2300, 2400, and 2500 in FIGS. 18A-18G, 19A, 19B, and 20-25 can be applicable to the implementation shown in FIG. 26. As such, the discussion of features related to hinges 1800, 1900, 2000, 2100, 2200, 2300, 2400, and 2500 above can be applicable to similarly numbered features shown in FIG. 26. One difference between hinge 2600 and hinges 1800, 1900, 2000, 2100, 2200, 2300, 2400, and 2500 is that in hinge 2600, second portion 1820 includes a cavity 2622 directly in a body thereof. Bias element 1823 can be carried in cavity 2622 directly.

Figure 27:
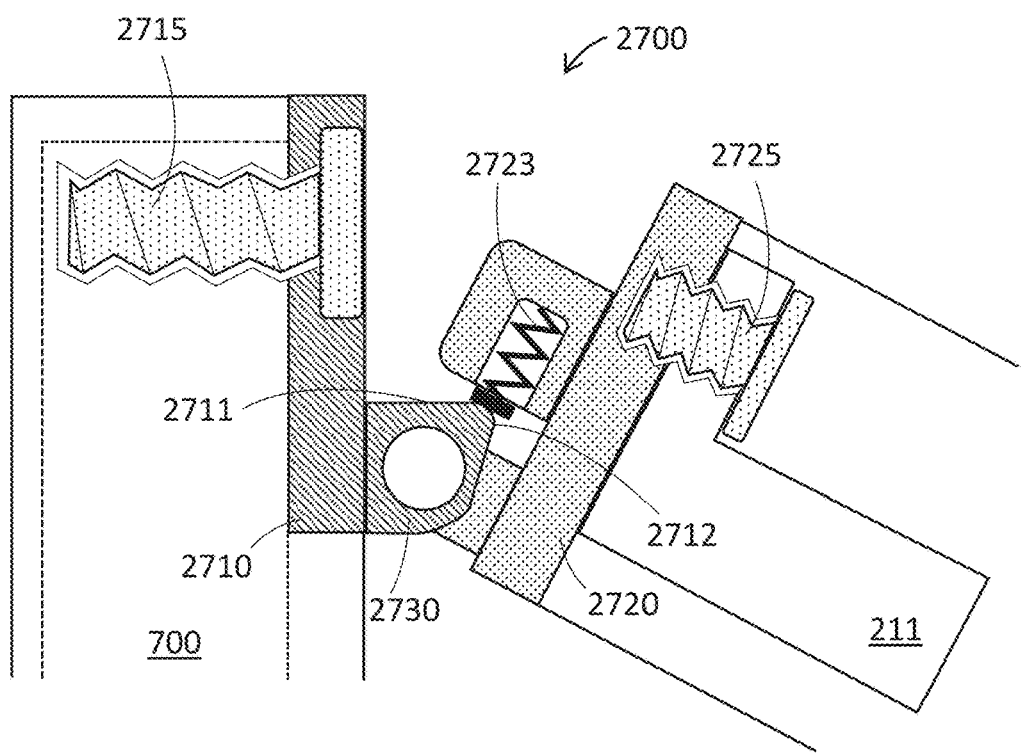
FIG. 27 is a top cutaway view of a hinge structure physically coupled to an optical combiner and a light engine, and including a bias element, in accordance with one or more embodiments described herein.

The implementations discussed with reference to FIGS. 8-17 above may be used in combination with the implementations discussed in FIGS. 18A-18G, 19A-19B, and 20-26 above. FIG. 27 illustrates one exemplary combination. FIG. 27 is a top cutaway view of a hinge 2700, which shows a combination of features such as those described in FIGS. 8-17 and 18-25. In particular, FIG. 27 illustrates hinge 2700 having a first portion 2710 directly coupled to an optical combiner 700 by at least one fastener 2715. Further, FIG. 27 illustrates hinge 2700 having a second portion 2720 directly coupled to a light engine 211 by at least one fastener 2725. First portion 2710 and second portion 2720 can rotate relative to each other about a pivot 2730. Further still, FIG. 27 illustrates a bias element 2723 which biases hinge 2700 towards an unfolded configuration by pushing against a first stop 2711, and inhibits movement between the unfolded configuration and a folded configuration when the bias element 2723 contacts a cam 2712.

Although FIG. 27 illustrates fastener 2715 and fastener 2725 as each being a single screw, fastener 2715 and fastener 2725 may include any appropriate fastener, such as a rivet, pin, clip, protrusion, adhesive, or any fasteners described with reference to FIGS. 8-17. Further, fastener 2715 and fastener 2725 may each include any appropriate number or combination of fasteners, such as one fastener, two fasteners, three fasteners, four fasteners, five fasteners, or even more fasteners.

Although FIG. 27 illustrates bias element 2723 as a spring, bias element 2723 may include any appropriate bias element, such as a compressible material or a piston, or any bias element as discussed with reference to FIGS. 22-25.

In addition to or alternative to bias elements such as those discussed above, in various implementations additional techniques for maintaining a hinge in a desired opening angle may be utilized. For example, hinges may be implemented with increased frictional resistance. In some implementations, silicon bushings or rubber bushings can be implemented for any the pivots discussed above. Such silicon bushings or rubber bushings provide frictional resistance to rotation of the hinge, which can act to restrict rotation of the hinge absent significant external force. In some implementations, the relative size of components of a pivot may be adjusted to increase frictional resistance of the hinge. In an exemplary hinge where a pivot includes at least one pin which rotates within at least one barrel, the diameter of each pin may be selected to be very close to the diameter of an opening in each barrel within which the pin rotates. In such an implementation, friction between the pin and the barrel will increase resistance to rotation of the hinge.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image may be displayed.

The WHUDs described herein may include one or more on-board power sources (e.g., one or more batteries), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. Techniques provided herein with respect to various embodiments may be applied to portable and/or wearable electronic devices other than the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or combination thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The various embodiments described above can be combined to provide further embodiments. To the extent that they are not inconsistent with the specific teachings and definitions herein, each of the following are incorporated by reference herein in their entirety: U.S. Provisional Patent Application Ser. No. 62/862,355 U.S. Non-Provisional patent application Ser. No. 15/145,576, U.S. Non-Provisional patent application Ser. No. 15/167,458, U.S. Non-Provisional patent application Ser. No. 15/046,254 now published as U.S. Pat. No. 9,989,764, U.S. Provisional Patent Application Ser. No. 61/928,568 (now U.S. Non-Provisional patent application Ser. No. 14/599,279, U.S. Non-Provisional patent application Ser. No. 14/155,087, U.S. Non-Provisional patent application Ser. No. 14/155,107, PCT Patent Application PCT/US2014/057029, U.S. Provisional Patent Application Ser. No. 62/236,060, U.S. Provisional Patent Application No. 62/754,339, U.S. Provisional Patent Application Ser. No. 62/782,918, U.S. Provisional Patent Application Ser. No. 62/789,908, U.S. Provisional Patent Application Ser. No. 62/845,956, U.S. Provisional Patent Application Ser. No. 62/791,514, U.S. Non-Provisional patent application Ser. No. 15/167,458, and U.S. Non-Provisional patent application Ser. No. 15/046,254 now published as U.S. Pat. No. 9,989,764. Aspects of the embodiments can be modified, if necessary, to employ systems, circuits and concepts of the various patents, applications and publications to provide yet further embodiments. These and other changes can be made to the embodiments in light of the above-detailed description.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A system, comprising:
a light engine assembly;
an optical combiner assembly; and
a hinge comprising:
a first portion that includes a recess and that is directly coupled to the optical combiner assembly at a first interface;
a second portion that is coupled via at least one mechanical fastener to the light engine assembly at a second interface; and
a pivot coupled to both the first portion and the second portion, the second portion to rotate relative to the first portion about the pivot between a folded configuration and an unfolded configuration, wherein in the unfolded configuration the light engine assembly is optically coupled to the optical combiner assembly and at least a portion of the at least one mechanical fastener interfaces with the recess of the first portion.

2. The system of claim 1, further comprising:
a support structure to be worn on a head of a user, the support structure comprising a first arm to be positioned on a first side of the head of the user and a front frame to be positioned on a front side of the head of the user, wherein:
the front frame is directly coupled to the optical combiner assembly; and
the first arm is directly coupled to the light engine assembly.

3. The system of claim 1, further comprising:
a support structure to be worn on a head of a user, the support structure comprising a first arm to be positioned on a first side of the head of the user and a front frame to be positioned on a front side of the head of the user, wherein:
the front frame is directly coupled to the first portion of the hinge; and
the first arm is directly coupled to the second portion of the hinge.

4. The system of claim 1 wherein:
the at least one mechanical fastener includes at least one of a screw, a pin, a rivet, a protrusion, or a clip.

5. The system of claim 1, wherein the optical combiner assembly includes at least two receptacles, and wherein the first interface includes at least two mechanical fasteners which each interface with a respective receptacle of the at least two receptacles.

6. The system of claim 1, wherein the first portion is directly coupled to the optical combiner assembly at the first interface, wherein the first portion includes a second receptacle, and wherein the first interface includes at least one mechanical fastener which interfaces with the second receptacle.

7. The system of claim 1, wherein the light engine assembly includes at least one light engine receptacle, and the at least one mechanical fastener includes a first mechanical fastener that interfaces with the at least one light engine receptacle.

8. The system of claim 1 wherein the second portion includes a receptacle, and the at least one mechanical fastener includes a first mechanical fastener that interfaces with the receptacle.

9. The system of claim 1, wherein the light engine assembly includes at least one mounting bracket, and the at least one mechanical fastener includes a first mechanical fastener that interfaces with the at least one mounting bracket.

10. The system of claim 1 wherein:
the first portion of the hinge comprises a stop and a cam, the cam positioned radially further from the pivot than the stop;
the second portion of the hinge carries a bias element, the bias element to project from the second portion to contact the stop of the first portion in the unfolded configuration; and
the bias element is further to contact the cam in a partial-folded configuration between the folded configuration and the unfolded configuration.

11. A method of manufacturing a wearable heads-up display (WHUD), the method comprising:
coupling a first portion of a hinge to a second portion of the hinge by a pivot, the first portion of the hinge being to rotate relative to the second portion of the hinge about the pivot between a folded configuration and an unfolded configuration;
coupling the first portion of the hinge to an optical combiner assembly; and
coupling the second portion of the hinge to a light engine assembly via at least one mechanical fastener, wherein at least a portion of the at least one mechanical fastener interfaces with a recess of the first portion in the unfolded configuration.

12. The method of claim 11, further comprising:
directly coupling the first portion of the hinge to a front frame of the WHUD to be positioned on a front of a head of a user; and
directly coupling the second portion of the hinge to a first arm to be positioned on a side of the head of the user adjacent the front of the head of the user.

13. The method of claim 11, further comprising:
directly coupling the optical combiner assembly to a front frame to be positioned on a front of a head of a user; and
directly coupling the light engine assembly to a first arm to be positioned on a side of the head of the user, the side of the head of the user being adjacent to the front of the head of the user.

14. A hinge for a wearable heads-up display having an eyeglass form-factor, comprising:
a pivot;
a first portion coupled to the pivot, wherein the first portion includes a first stop and a cam, and wherein the cam is positioned radially further from the pivot than the first stop; and
a second portion coupled to the pivot, wherein the second portion includes a bias element that projects from the second portion towards the pivot, and wherein the second portion rotates relative to the first portion about the pivot between a folded configuration, a partial-folded configuration in which the bias element of the second portion contacts the cam of the first portion, and an unfolded configuration in which the bias element of the second portion contacts the first stop of the first portion.

15. The hinge of claim 14, wherein the first portion further comprises a second stop non-parallel to the first stop, the bias element to project from the second portion towards the second stop in the folded configuration.

16. The hinge of claim 15, wherein in the folded configuration the bias element contacts the second stop.

17. The hinge of claim 15, wherein in the folded configuration the bias element does not contact the second stop.

18. The hinge of claim 14, wherein the second portion includes a cavity, and wherein the bias element is positioned within the cavity and projects towards an opening of the cavity.

19. The hinge of claim 14, wherein the bias element is carried on a surface of the second portion.

20. The hinge of claim 14, wherein the bias element includes a spring.

21. The hinge of claim 14, wherein the bias element includes a piston.

22. The hinge of claim 14, wherein the cam is a curved surface.

23. The hinge of claim 14, wherein the cam comprises at least one sharp point.

\* \* \* \* \*